US006711562B1

United States Patent
Ross et al.

(10) Patent No.: US 6,711,562 B1
(45) Date of Patent: Mar. 23, 2004

(54) CACHE SENSITIVE SEARCH (CSS) TREE INDEXING SYSTEM AND METHOD

(75) Inventors: Kenneth A. Ross, New York, NY (US); Jun Rao, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 09/600,266

(22) PCT Filed: Dec. 1, 1999

(86) PCT No.: PCT/US99/28430

§ 371 (c)(1), (2), (4) Date: Feb. 27, 2002

(87) PCT Pub. No.: WO01/40996

PCT Pub. Date: Jun. 7, 2001

(51) Int. Cl.$^7$ .............................................. G06F 17/30
(52) U.S. Cl. .............................. 707/3; 707/2; 707/200
(58) Field of Search ........................ 707/1, 2, 3, 100, 707/200, 205; 711/216, 100, 133, 141

(56) References Cited

U.S. PATENT DOCUMENTS

| | | | |
|---|---|---|---|
| 5,283,894 A | | 2/1994 | Deran .............................. 707/1 |
| 5,664,184 A | * | 9/1997 | Ferguson et al. ........ 707/103 R |
| 5,668,987 A | * | 9/1997 | Schneider ........................ 707/3 |
| 5,758,356 A | * | 5/1998 | Hara et al. ..................... 707/202 |
| 5,822,749 A | | 10/1998 | Agarwal ........................... 707/2 |
| 5,826,253 A | | 10/1998 | Bredenberg ..................... 707/2 |
| 5,940,838 A | | 8/1999 | Schmuck et al. ............ 707/200 |
| 6,047,280 A | | 4/2000 | Ashby et al. .................... 707/2 |
| 6,061,678 A | | 5/2000 | Klein et al. ...................... 707/3 |
| 6,266,660 B1 | * | 7/2001 | Liu et al. ......................... 707/3 |
| 6,408,362 B1 | * | 6/2002 | Arimilli et al. .............. 711/133 |
| 6,578,131 B1 | * | 6/2003 | Larson et al. ................ 711/216 |

OTHER PUBLICATIONS

"Cache Conscious Indexing for Decision–Support in Main Memory", Proceedings of the 25th International Conference on Very Large Data Bases, Jun Rao and Kenneth A. Ross, Sep. 7–10, 1999, Edinburgh, Scotland, UK, pp. 78–89.

"Cache Conscious Indexing for Decision–Support in Main Memory", Columbia University Technical Report CUCS–019–98, Jun Rao and Kenneth A. Ross, Dec. 1, 1998, pp. 0–17.

"Making B$^+$–Tree Cache Conscious in Main Memory", ACM SIGMOD 2000, May 2000, Jun Rao and Kenneth Ross, pp. 475–486.

Lehman et al., "A Recovery Algorithm for A High–Performance Memory–Resident Database System", Proceedings of the ACM SIGMOD Conference, pp. 104–117, 1987.

(List continued on next page.)

*Primary Examiner*—Charles Rones
*Assistant Examiner*—Neveen Abel-Jalil
(74) *Attorney, Agent, or Firm*—Baker Botts LLP

(57) ABSTRACT

Cache sensitive search tree (CSS-tree) index structures for providing improved search and lookup performance compared with conventional searching schemes. The CSS-tree index structures include a directory tree structure which is stored in an array (216) and serves as an index for a sorted array of elements. The nodes (215) in the directory tree structure may be of sizes selected to correspond to the cache line size in the computer system utilizing the CSS-tree index structures. Child nodes (213) within the directory tree structure are located by performing arithmetic operations on array offsets. Thus, it is not necessary to store internal child node pointers, thereby reducing memory storage requirements. In addition, the CSS-tree index structures are organized so that traversing each level in the tree yields good data reference locality, and therefore relatively few cache misses. Thus, the CSS-tree index structures consider cache-related parameters such as reference locality and cache behavior, without requiring substantial additional amounts of memory.

44 Claims, 9 Drawing Sheets

OTHER PUBLICATIONS

LaMarca et al., "The Influence of Caches on the Performance of Heaps", ACM Journal of Experimental Algorithmics, 1996.

COMPAQ, "InfoCharger Engine: Optimization for Decision Support Solutions", 1998.

Chilimbi et al., "Improving Pointer–Based Codes Through Cache–Conscious Data Placement"., Technical Report '98, University of Wisconsin–Madison, Computer Science Department, 1998.

TimesTen Performance Software White Paper, "Architected for Real–Time Data Management; TimesTen's Core In–Memory Database Technology", (Revised Version) 1997.

Sun Microsystems, "UltraSPARC™ User's Manual", UltraSPARC–1 UltraSPARC–II, Jul. 1997.

Phil Bernstein et al., "The Asilomar Report on Database Research," *ACM Sigmod Record*, 27 (4), 1998.

Sybase Corporation, *Sybase I.Q. 11.2.1*, 1997.

* cited by examiner

CACHE SENSITIVE SEARCH (CSS) TREE INDEXING SYSTEM AND METHOD

NOTICE OF GOVERNMENT RIGHTS

The United States Government has certain rights in this invention pursuant to the terms of National Science Foundation (NSF) grant number IIS-98-12014, NSF Computer and Information Sciences and Engineering (CISE) award number CDA-9625374, and the NSF Young Investigator Award number IRI-9457613 (1994).

FIELD OF THE INVENTION

The present invention relates to indexing techniques for searching computer system main memories, and more specifically, to indexing structures relating to searching of databases and arrays.

BACKGROUND OF THE INVENTION

As random access memory becomes less expensive, it becomes increasingly more affordable to build computer systems with large memory systems, and in particular, large main memory systems. Within the next ten years, it may be possible to build computer systems having a terabyte of main memory serving as a buffer for a 100-terabyte database. As a result, all but the largest database tables could reside in main memory. Nevertheless, data processing performance in main memory cannot be increased indefinitely simply by increasing main memory size, even with the use of a cache memory subsystem. Therefore, it is becoming increasingly more important to improve cache memory strategy during main memory data processing operations.

Index structures are a significant factor in main memory database system performance, and can be used to reduce overall computation time without consuming very much additional memory space. In sufficiently large memory systems, most indexes can be memory resident. Indexing in main memory databases, and the performance measurements associated therewith, have been addressed in the literature, for example, in J. Lehman and Michael J. Carey, A Study of Index Structures for Main Memory Database Management Systems, Proceedings of the $12^{th}$ VLDB Conference, pages 294–303, 1986, and in Kyu-Young Whang and Ravi Krishnarnurthy, Query Optimization in a Memory-Resident Domain Relational Calculus Database System, ACM Transactions on Database Systems, 15(1): 67–95, 1990, the contents of which are incorporated herein by reference. In recent years, central processor unit (CPU) speeds have increased at a much faster rate than have memory access speeds. As a result, the relative cost in time of cache misses has increased substantially. For this reason, the relative performance advantages of certain prior art indexing methods may no longer be applicable.

Another recent development relevant to the optimal selection of index structures has been the increased interest in On-Line Analytical Processing (OLAP). The respective data processing requirements of OLAP systems and of On-Line Transaction Processing (OLTP) systems are addressed in Clark D. French, "One Size Fits All" Database Architectures Do Not Work for DDS, Proceedings of the ACM SIGMOD Conference, page 449–450, 1995, and in Clark D. French, Teaching an OLTP Database Kernel Advanced Data Warehousing Techniques, Proceedings, IEEE Int'l Conf. On Data Eng., 1997, the contents of which are incorporated herein by reference. The performance of a typical OLAP system can be enhanced by improving query performance, even if at the expense of update performance. Certain commercial systems designed for such purposes include Sybase IQ, which is described in Sybase Corporation, Sybase IQ 11.2.1, 1997, the contents of which is incorporated herein by reference. OLAP system performance can be improved in this way because typical OLAP application workloads are query-intensive, but require infrequent batch updates. For example, in applications involving census data, large quantities of data is collected and updated periodically, but then remain static for relatively long periods of time. In contrast, a typical university's data warehouse containing student records may be updated daily. Certain systems in which data remain static for relatively long periods of time presently may be on the order of several gigabytes in size, and therefore can be stored within present day main memory systems. Because updates in such systems are typically relatively infrequent and are batched, the performance associated with incremental updates of indexes in these systems may not be critical. In fact, it may even be efficient to reconstruct indexes entirely from scratch after relatively infrequent batch updates, if such an approach leads to improved query performance.

Generally speaking, the two most important criteria in selecting particular index structures are the amount of available memory space, and query performance. Because memory space normally is a critical factor in constructing main memory databases, there typically is limited space available for precomputed structures such as indexes. In addition, given a particular set of memory space constraints, the objective is to minimize the time required to perform index lookups. In main memory databases, an important factor influencing the speed of database operations is the degree of locality for the data references for the particular algorithm being run. Superior data locality leads to fewer cache misses, and therefore improved performance.

As is well known in the art, cache memories normally are fast static random access memories (RAM) that improve computer system performance by storing data likely to be accessed by the computer system. Memory references which can be satisfied by the cache are known as hits, and proceed at processor speed. Those memory references which are not found in the cache are known as misses, and result in a cache miss time penalty in the form of a fetch of the corresponding cache block from main memory. Caches are normally characterized by their capacity, block size and associativity. Capacity refers to the cache's overall memory size; block size is the size of the basic memory unit which is transferred between cache and main memory; and associativity refers to the number of locations in the cache which are potential destinations for any single main memory address.

Typical prior art cache optimization techniques for data processing applications include clustering, compression and coloring as set forth in Trishul M. Chilimbi, James R. Larus, Mark D. Hill, Improving Pointer-Based Codes Through Cache-Conscious Data Placement, Technical Report 98, University of Wisconsin-Madison, Computer Science Department, 1998, the contents of which is incorporated herein by reference. Clustering techniques attempt to pack into a cache block data structure elements which are likely to be accessed successively. Compression attempts to remove irrelevant data from the cache and thus increase cache block utilization by enabling more usable data structure elements to be placed in the cache blocks. Compression includes key compression, structure encodings such as pointer elimination, and fluff extraction. Coloring techniques map contemporaneously-accessed data structure elements onto non-conflicting regions of the cache. Caches inherently have such conflicting regions because they have finite levels of associativity, which results in only a limited number of concurrently accessed data elements being able to be mapped to the same cache line without generating a conflict.

Certain prior art has proposed improvements in cache performance using these techniques. For example, in Michael E. Wolf, et al., A Data Locality Optimizing Algorithm, SIGPLAN Notices, 26(6):30–44, 1991, cache reference locality is exploited in an effort to improve the performance of matrix multiplication. In Anthony LaMarca, et al., The Influence of Caches on the Performance of Sorting, Eighth Annual ACM-SIAM Symposium on Discrete Algorithms, 1997, the effects of caches on sorting algorithms is considered, and performance was improved by restructuring these algorithms to exploit cache characteristics. In addition, there was constructed a cache-conscious heap structure which clustered and aligned heap elements with cache blocks. In Trishul M. Chilimbi, James R. Larus. and Mark D. Hill, Improving Pointer-Based Codes Through Cache-Conscious Data Placement, Technical Report 98, University of Wisconsin-Madison, Computer Science Department, 1998, it was demonstrated that cache optimization techniques can be used to improve the spatial and temporal locality of pointer-based data structures. In Chris Nyberg, et al., Alphasort: A RISC Machine Sort, Proceedings of the ACM SIGMOD Conference, pages 233–242, May 1994, it was shown that cache memory behavior should be closely considered in achieving high performance sorting. The contents of each of these references is incorporated herein by reference.

Cache conscious algorithms have also been considered in the context of database systems. For example, in Ambuj Shatdal, et al., Cache Conscious Algorithms for Relational Query Processing, Proceedings of the $20^{th}$ VLDB Conference, 1994, the contents of which is incorporated herein by reference, there were suggested several approaches for improving the cache reference locality of query processing operations, such as joins and aggregations, for example. Algorithms were presented therein which provided significant performance improvements.

Although cache optimization previously has been considered in connection with tree-based structures, it has not been considered in connection with index structures used in database systems. Although certain prior art has considered the issue of compact representations of B-tree indexes, cache issues have not been considered. Examples of such prior art include F. Cesarini, et al., An Algorithm to Construct a Compact B-Tree in Case of Ordered Keys, Information Processing Letters, 17(1):1612–1630, 1983, and Wiebren De Jonge, et al., Two Access Methods Using Compact Binary Trees, IEEE Transactions on Software Engineering, 13(7):799–810, 1987, the contents of which are incorporated herein by reference.

Each type of database indexing structure known in the prior art has inherent characteristics which impact cache performance. For example, in the case of array binary searches, many accesses to elements of the sorted array may result in a cache miss. Although misses do not normally occur for the first references because of temporal locality over many searches, and also do not normally occur for the last references because of spatial locality, if many records from the array fit inside a single cache line, misses nevertheless occur for many of the intervening accesses when the array is substantially larger than the cache. In the worst case scenario, the number of cache misses is of the order of the number of key comparisons.

T-Trees have been proposed as an improved database index structure, but also exhibit cache behavior similar to that exhibited by binary searching. T-trees are balanced binary trees having many elements in a node; these elements contain adjacent key values and are stored in order. Although the objective of T-Trees is to balance the memory space overhead and the search time, T-Trees nevertheless do not optimize cache behavior or performance. Although T-Trees may initially appear to be cache conscious in that they place a greater number of keys in each node, for most T-Tree nodes only one or two end keys are actually used for purposes of comparison. As a result, the utilization of each node is relatively low. For this reason, the number of key comparisons remains the same as in a binary search, and cache behavior and performance is not improved. T-Trees are addressed in additional detail in Tobin J. Lehman and Michael J. Carey, Query Processing in Main Memory Database Management Systems, Proceedings of the ACM SIGMOD Conference, pages 239–250, 1986, and Tobin J. Lehman and Michael J. Carey, A Study of Index Structures for Main Memory Database Management Systems, Proceedings of the $12^{th}$ VLDB Conference, pages 294–303, 1986, the contents of which are incorporated herein by reference.

B+-Trees and enhanced B+-Trees provide improvements in cache behavior and performance as compared to the cache performance associated with T-Trees. In B+-Trees, each internal node has stored therein internal node keys and child pointers. Record pointers, however, are stored only in leaf nodes. Multiple keys can be used to search within a node. If each node is of a size that can fit in a cache line, a single cache load can provide data capable of satisfying more than one comparison. This results in improved utilization rates for each cache line. In an OLAP environment, enhanced B+-Trees can be used to utilize all of the locations in a B+-tree node, and trees can be rebuilt whenever batch updates arrive. This approach is similar to that which was used in compact B-Trees, as discussed in F. Cesarini, et al., An Algorithm to Construct a Compact B-Tree in Case of Ordered Keys, Information Processing Letters, 17(1):1612–1630, 1983, and by the Indexed Sequential Access Method (ISAM) used in IBM's OS/360 operating system, as discussed in Jim Gray, et al., Transaction Processing: Concepts and Techniques, The Morgan Kaufmann Publishers, San Francisco, Calif., USA, 1993. The contents of both of these references are incorporated herein by reference. In enhanced B+-Trees, node size can be designed to be exactly the same size as the cache lines, and in addition, the nodes can be aligned. Nevertheless, such enhanced B+-Trees must store child pointers within each node, which for any given node size permits only half of the node space to be used to store keys. This results in less than optimal cache behavior and performance. Although the discussion presented below addresses primarily enhanced B+-Trees, the term B+-Trees is also used to describe enhanced B+ trees.

Hash indexes can also greatly benefit from improved cache optimization. One of the most common hashing methods is known as chained bucket hashing, which is discussed in additional detail in Donald Ervin Knuth, Sorting and Searching, vol. 3 of The Art of Computer Programming, Addison-Wesley, Reading, Mass., USA, 1973, the contents of which art is incorporated herein by reference. Certain efforts have been made to improve cache performance in such hash indexing schemes. For example, in Goetz Graefe, et al., Hash Joins and Hash Teams in Microsoft SQL Server, Proceedings of the 24th VLDB Conference, pages 86–97, 1998, the contents of which is incorporated herein by reference, the cache line size was used as the bucket size. This type of approach has the potential to reduce the number of cache misses when scanning through the buckets. However, hash indexes expedite fast searching only if the length of each bucket chain is relatively small. Such an arrangement, however, requires a relatively large directory size, which in turn requires a relatively large amount of main memory space. In addition, skewed data can adversely affect hash index performance, unless the hash function is relatively sophisticated which in turn increases computation time. Further, hash indexes normally do not preserve any type of order, which in turn detracts from cache performance. In order to provide ordered access using hash indexes, an ordered list must be maintained in addition to the hash indexes.

Therefore, in view of the above-described examples and limitations in the existing art, a need has arisen for techniques to optimize cache performance in connection with index structures used in performing searches in database systems. The need has thus arisen for cache conscious indexing structures, and in particular for cache sensitive search tree indexing structures.

SUMMARY OF THE INVENTION

It is an object of the present invention to provide cache sensitive search tree (CSS-tree) index structures for providing improved searching of sorted arrays.

It is another object of the present invention to provide CSS-tree index structures which provide improved search and lookup performance as compared with conventional searching schemes.

It is yet another object of the present invention to provide CSS-tree index structures having a directory tree structure which is stored in an array and utilized as an index for a sorted array of elements.

It is still another object of the present invention to provide CSS-tree index structures having a directory tree structure containing nodes of sizes selected to correspond to the cache line size in the computer system utilizing the CSS-tree index structures.

It is a further object of the present invention to provide CSS-tree index structures having a directory tree structure containing child nodes which are located by performing arithmetic operations on array offsets.

It is yet a further object of the present invention to provide CSS-tree index structures having a directory tree structure in which memory storage requirements are reduced because it not necessary to store internal child node pointers.

It is a still further object of the present invention to provide CSS-tree index structures organized so that traversing each level in the tree yields good data reference locality, and therefore relatively few cache misses.

It is another object of the present invention to provide CSS-tree index structures which consider cache-related parameters such as reference locality and cache behavior, without requiring substantial additional amounts of memory storage.

In accordance with the present invention there are provided a search tree index system and method for locating a particular key value stored in a sorted array of key values. The system includes a computer memory for storing a search tree structure having a plurality of leaf nodes, wherein each leaf node contains multiple key values and the leaf nodes can reference the key values stored in the sorted array according to an offset value. The search tree structure stored in computer memory also has a plurality of internal nodes, wherein each internal node contains multiple key values and has associated therewith multiple children nodes. The children nodes can be referenced by the internal node associated therewith according to another offset value. The children nodes associated with each internal node can be either internal nodes or leaf nodes. The system also includes a computer processor with a cache memory characterized by a cache size, a cache line size and an associativity level. The computer processor is coupled to the computer memory to provide computational access to the sorted array of key values, the leaf nodes and the internal nodes. The computer processor determines for the key value being searched the offset value necessary to reference the children nodes from the internal nodes, and the offset value necessary to reference the key value from the leaf nodes and to locate the key value in the sorted array of key values. The quantity of internal nodes and the quantity of leaf nodes stored in the memory correspond to the characteristics of the cache memory.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
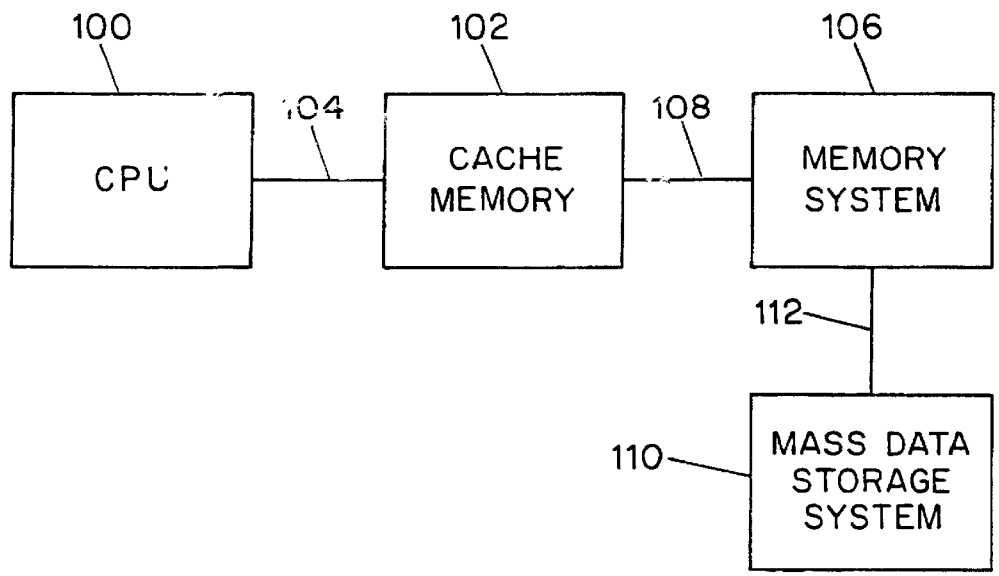
FIG. 1 is a block diagram illustrative of an exemplary computer system capable of implementing searching utilizing the CSS-tree index structures of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

The cache sensitive search tree (CSS-tree) indexing structures (also referred to herein simply as CSS-trees) of the present invention provide improved search and lookup performance as compared with conventional searching methods such as binary searching. This is accomplished by considering parameters such as reference locality and cache behavior, without using substantial additional amounts of memory to store the index structure. In particular, a preferred embodiment of the CSS-trees of the present invention operates by storing a directory (index) structure on top of a sorted array of elements (preferably a sorted array of keys, which are well known in the art to represent fields by which data records can be searched). This directory structure preferably is stored in an array. The CSS-tree index structure of the present invention can be used to efficiently search for and locate keys stored in the sorted array. Once the desired key has been located, any desired data record corresponding to that key can be easily located using any conventional method, and the search is complete.

Nodes in the CSS-tree index directory structure preferably have sizes selected to correspond to the cache-line size in the particular computer system utilizing the CSS-tree searching of the present invention. In addition, unlike enhanced B+-trees (sometimes referred to herein below simply as B+-trees), internal child node pointers preferably are not stored in the CSS-trees of the present invention; rather, child nodes preferably are located by performing arithmetic operations based on array offsets. Similarly, the keys which reside in the sorted array of keys being searched are also preferably located by performing arithmetic operations based on array offsets. Because of these characteristics, the CSS-trees of the present invention are cache conscious, and therefore provide superior cache performance. Further, the CSS-trees of the present invention preferably are organized so that traversing the tree yields superior data reference locality, and therefore relatively few cache misses.

FIG. 1 depicts a typical prior art computer system which can perform searching operations on databases utilizing the CSS-tree indexing structures of the present invention. The depicted computer system includes a CPU 100 connected to cache memory 102 via data bus 104. Cache memory 102 in turn is connected to memory system 106 via data bus 108. Memory system 106 may for example be a main memory system, or alternatively, another level of cache memory connected to and in combination with a main memory system. The main memory portion of memory system 106 typically is connected to a mass data storage system 110 via data bus 112. Also normally included in a typical computer system but not shown in FIG. 1 are I/O (input/output) devices. In computer applications involving databases, the databases normally are stored in mass data storage system 110. In addition, as memory space permits, such databases may also be stored either in whole or in part in the main memory system such as is contained in memory system 106 for example, as well as cache memory 102.

Although the CSS-trees of the present invention may be configured in many ways, the characteristics of the present invention can be illustrated using two exemplary preferred embodiments of the present invention, namely, full CSS-trees and level CSS-trees. In the case of full CSS-trees, the number of child nodes for each node equals m+1, where m is defined to be the number of entries in each node within the CSS-tree indexing structure. In the case of level CSS-trees, the number of child nodes for each node equals m, and one key entry location in each node is not utilized. Thus, full CSS-trees are not as deep as level CSS-trees. Accordingly, fewer cache blocks need to be loaded when utilizing full CSS-trees, because cache loads occur only when there is a transition from one tree level to the next. On the other hand, level CSS-trees can be constructed with nodes requiring on average fewer comparisons than are required by nodes in full CSS-trees, in the special case where m is an integer power of 2.

Figures 2A, 2B:
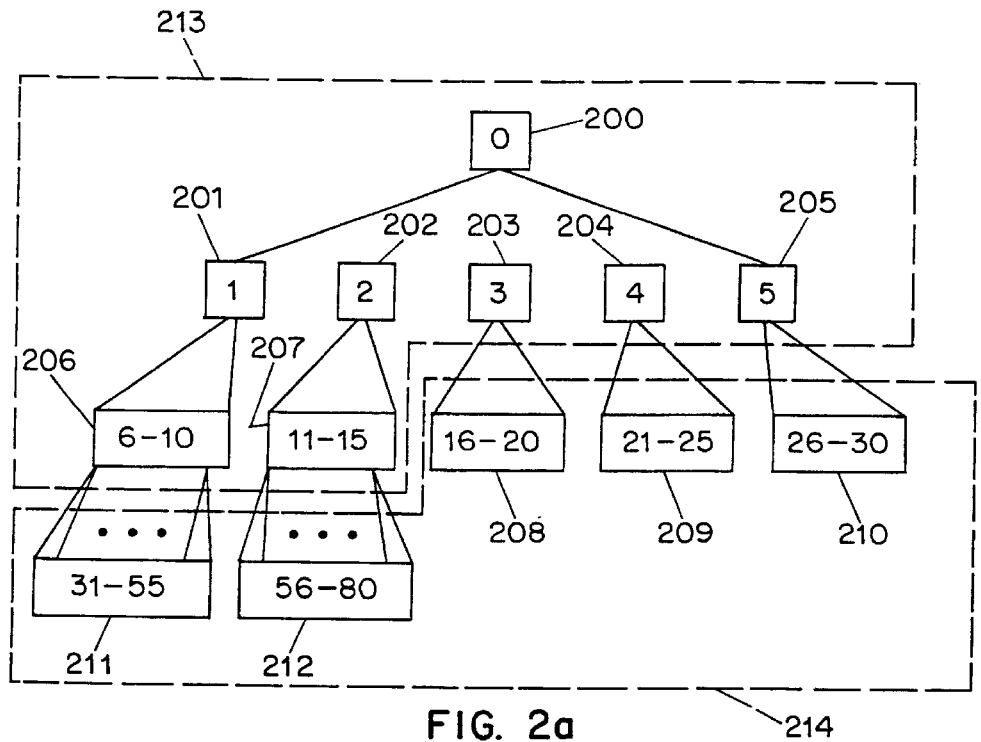
FIG. 2a is a diagram illustrating an exemplary CSS-tree index structure of the present invention.
FIG. 2b is a diagram illustrating an exemplary CSS-tree index structure of the present invention.

FIGS. 2a and 2b depict a representation of an exemplary full CSS-tree wherein m equals 4, and wherein there are therefore 5 child nodes for each node. In FIG. 2a, the depicted CSS-tree comprises internal nodes 200–207 (collectively, internal nodes 213) and leaf nodes 208–212 (collectively, leaf nodes 214). The numbers appearing inside the boxes representing internal nodes 200–207 and leaf nodes 208–212 denote the number(s) assigned to the internal node(s) or leaf nodes represented by each box. If the depth of the depicted CSS-tree is defined to be d, then the tree constitutes a complete (m+1)-ary search tree up to the level of d−1. At depth d the leaf nodes 208–212 are filled from left to right with sorted key values. In the exemplary embodiment depicted in FIG. 2a, each internal node comprising group of internal nodes 213 contains key values representing the boundaries in the ranges of the key values contained in that internal node's child nodes. This arrangement for each of the multiple levels of the CSS-tree depicted in FIG. 2a facilitates the CSS-tree's indexing features, by enabling each internal node comprising group of internal nodes 213 to direct an indexed search for particular key values to the appropriate node in the next-lower level in the search tree.

The nodes of a CSS-tree such as that depicted in FIG. 2a can be stored in an array 215 as depicted in FIG. 2b. FIG. 2b also depicts a representation of the sorted array 216 of key values to be searched. Preferably, the key values stored in leaf nodes 214 are mapped onto the key values stored in sorted array 216, as represented by mapping arrows 217. This mapping is performed using a series of calculated offsets, rather than stored explicit pointers, as will be discussed in additional detail below. Thus, in the CSS-trees of the present invention, it is not necessary to store explicit pointers to child nodes; rather, the location of child nodes can be calculated as a function of specified offsets in the CSS-tree array 215. These calculations are also discussed in additional detail below.

The CSS-trees of the present invention, such as the exemplary embodiment depicted in FIGS. 2a and 2b, provide better cache performance and therefore can be traversed more efficiently than trees used in conventional search methods, such as binary searching In an exemplary preferred embodiment m is selected so that a node fits in a cache line. In such an arrangement, all searching within a single node can be performed with at most one cache miss. Accordingly, there occurs no more than $\log_{m+1} n$ cache misses for any given search, as compared to as many as $\log_2 n$ cache misses if binary searching is being used. Even if in this preferred embodiment of the present invention a node occupies two cache lines, on average only one cache miss will occur in half of the searches within a single node, whereas two misses will occur in the other half. In addition, the code implementing the traversal within a single node preferably is hard coded, so that the calculations necessary to locate the next node can be performed more efficiently.

Referring to the exemplary preferred embodiment depicted in FIG. 2a, a specific example is presented. In the example, presented, the nodes and keys therein are each numbered from top to bottom and left to right, beginning with number 0. Thus, for any internal node comprising group of internal nodes 213 numbered b, the children of that node are numbered from b(m+1)+1 to b(m+1)+(m+1). Within the CSS-tree directory depicted in FIG. 2a, there are m keys per node as discussed above. Therefore, any arbitrary key number i stored in the CSS-tree directory array 215 maps to node number $$\left\lfloor \frac{i}{m} \right\rfloor.$$

Therefore, the offset of the lowest-numbered (i.e., the first) key for each of the child nodes within the CSS-tree directory array 215 will be $$\left(\left\lfloor \frac{i}{m} \right\rfloor*(m+1)+1\right)*m$$

through $$\left(\left\lfloor \frac{i}{m} \right\rfloor*(m+1)+m+1\right)*m,$$

where "⌊ ⌋" denotes that the enclosed quantity is rounded to the next lower integer.

In the exemplary CSS-tree depicted in FIGS. 2a and 2b, leaf nodes 214 are stored in a contiguous array 215 in key order. This approach conflicts with the general approach called for by the natural order of a CSS-tree, which generally stores nodes from left to right within each level. Use of this general approach would undesirably split the array 215, and would place the right half of the array (which appears at a higher tree level than does the left half of the array) before the left half of the array. Thus, in the example depicted in FIG. 2a, use of the natural CSS-tree order would result in leaf nodes 208–210 (i.e., the leaf nodes having node numbers 16–30) being stored before leaf nodes 211–212 (i.e., the leaf nodes having node numbers 31–80). However, when the leaf nodes are stored in a sorted array such as sorted array 216, leaf nodes 211–212 (i.e., the leaf nodes having node numbers 31–80) are stored before leaf nodes 208–210 (i.e., the leaf nodes having node numbers 16–30). This is because it is desirable to maintain sorted array 216 in contiguous key order. Therefore, in order to determine the correct leaf nodes 214 when performing a search using a CSS-tree, the general CSS-tree search method must be modified as discussed below.

In the example depicted in FIGS. 2a and 2b, the two portions of leaf nodes 214 (i.e., one portion containing leaf nodes 208–210 and the other portion containing leaf nodes 211 212) in array 215 are shown mapped into sorted array 216 in FIG. 2b. This mapping preferably is performed by first determining y, which is defined to be the number of the key which represents the boundary point between these two portions of leaf nodes 214. This value y also represents the value of the offset corresponding to the lowest-numbered key in the deepest leaf node level in the CSS-tree. This leaf node is defined herein as "Mark," and in the particular example depicted in FIGS. 2a and 2b, this is the node having node number 31 in group of nodes 211.

Given an arbitrary offset x of an arbitrary key in a leaf node, the offset x is first compared with y to determine which of the two portions of leaf nodes 214 contains the arbitrary key, and therefore which portion of the sorted array 216 should be searched. For example, if x>y, the desired key element can be located at position x−y from the beginning of sorted array 216. If on the other hand, if x≦y, the desired key element can be located at position y−x from the end of sorted array 216. For example, in the example depicted in FIGS. 2a and 2b, the first key in the leaf nodes 214 having leaf node number 30 can be located at the first key in the node having node number 64 in sorted array 216.

These techniques are also applicable to sorted arrays 216 containing elements having sizes different from the key size. This is because the offsets into the array 215 of leaf nodes 214 are independent of the record size within the sorted array 216.

The value for y and the node number corresponding to the highest-numbered (i.e., the last) internal node 213 can be determined according to the equations presented below. From these values, the appropriate key offsets can be determined by multiplying these values by m, the number of keys per node. If n=N*m is defined to be the number of elements in sorted array 216, where N is the total number of leaf nodes 214, then the total number of internal nodes in a full CSS-tree is equal to:

$$\frac{(m+1)^k - 1}{m} - \left\lfloor \frac{(m+1)^k - N}{m} \right\rfloor.$$

The first leaf node in the bottom level is defined as "Mark," and is the node having node number $$\frac{(m+1)^k - N}{m}.$$

In the above expressions, k is defined to be $\lceil \log_{m+1}(N) \rceil$, where "⌈ ⌉" denotes that the enclosed quantity is rounded to the next higher integer.

An exemplary method of constructing a full CSS-tree, such as the exemplary full CSS-tree depicted in FIG. 2a, from a sorted array 216 is now presented. The sorted array 216 is first divided logically into two portions as described above, and a mapping is then established between the leaf nodes 214 and the elements in the sorted array 216. In the example depicted in FIGS. 2a and 2b., these two portions of the sorted array 216 are denoted by Roman numerals I and II, respectively. The highest-numbered (i.e., the last) internal node comprising group of internal nodes 213 is then determined as described above. In the example depicted in FIGS. 2a and 2b, this is the internal node having node number 15 in group of nodes 207. Beginning with this last internal node, each key entry in the node is then filled in with the highest key value contained in that node's subtree. The value of the highest-numbered key contained in a node's subtree can be determined for each key entry by following that node's link in its rightmost branch down the tree levels until a leaf node in group of leaf nodes 214 is reached. Once the leaf node in group of leaf nodes 214 is reached, the highest-numbered key value contained in that leaf node is used as this value. This process is then repeated for each key location for all of the remaining internal nodes 213, preferably in descending node number order.

An exemplary pseudo-code implementation of a preferred construction method for an exemplary full CSS-tree of the present invention is presented below:

```
Input: the sorted array (a),
       number of elements in the array (n).
Output: the array storing the internal nodes of a full CSS-tree (b).
        last internal node number (LNode).
        index of the first entry of the leftmost leaf node in the bottom
        level in a CSS directory array. (MARK).
Method:
Calculate the number of internal nodes needed and allocate space for b.
Calculate LNode, MARK.
for i=the array index of the last entry of node LNode to 0 {
    Let d be the node number of entry i.
    Let c be the node number of entry i's immediate left child node.
    while c <= LNode) {
        Let c be the node number of the (m+1)th child of c.
    }
    //now we are at the leaves, map to the sorted array.
    Let diff be the difference of the array index of the first entry in
    node c and MARK.
    if (diff<0) {//map to the second half of the array from the end.
        b[i]=a[diff+n+m−1];
    }
    else { //map to the first half of the array from the beginning.
        if ((diff+m−1) is in the first part of the array)
            b[i]=a[diff+m−1];
        else
            b[i]=the last element in the first part of the array.
    }
}
return b, LNode and MARK.
```

In certain embodiments of the present invention, certain internal nodes 213, namely those which are ancestors of the rightmost (i.e., last) leaf node at the deepest level of the CSS-tree, may not always contain a full complement of keys. This may occur for example as a result of the particular size of the sorted array 216 being searched. In this case, any so-called dangling keys preferably are filled with the last element in the first portion of sorted array 216. This may result in certain internal nodes 213 containing duplicate keys, however. In an exemplary preferred searching method used in connection with a CSS-tree constructed in such a way that duplicates may exist, the search method within each node preferably is adapted so that the leftmost key will always be located. This ensures that the leaf nodes 214 in the deepest level of the CSS-tree will never be reached using an index which is out of the range of the first portion of the sorted array 216.

Once a full CSS-tree is constructed as discussed above, a search may be performed to locate any key value stored in sorted array 216. In an exemplary preferred embodiment, the search preferably begins with the root node 200, which in the exemplary embodiment depicted in FIG. 2a is designated as node number 0. For each individual internal node in group of internal nodes 213, a conventional binary search preferably is performed to determine to which child node to branch next. This process preferably is continued until a leaf node 214 is reached. This leaf node 214 is then preferably mapped into the appropriate node in the sorted array 216, where a conventional binary search is preferably performed to locate the desired key value within the node being searched.

An exemplary pseudo-code implementation for a preferred key search method using an exemplary full CSS-tree of the present invention is presented below:

```
Input:
    the sorted array (a),
    the array consisting of the internal nodes of a full
        CSS-tree (b),
    number of elements in the sorted array (n).
    last internal node number (LNode).
    index of the first entry of the leftmost leaf node in the
        bottom level in a CSS directory array. (MARK).

Output: the index of the matching key in array a; if the key is found;
        −1: otherwise.
Method:
d=0;
while (d < LNode) {
    binary search node d to find the correct branch 1 to go to.
    (hard-coded)
    Let d be the node number of the ith child of d.
}
Let diff be the difference of the array index of the first entry in node d and
MARK.
if (diff<0) {//map to the second half of the array from the end.
    binary search a[num+diff..num+diff+m−1]. (hard-coded)
}
else {//map to the first half of the array from the beginning.
    binary search a[diff..diff+m−1]. (hard-coded)
}
if (the last binary search succeeds)
    return the index of the matching key in array a;
else
    return −1;
```

In the exemplary CSS-tree search methods discussed above, the binary searches performed within a particular node preferably are implemented using so-called hard-coded "if-else" statements. When such binary searching is performed within the internal nodes 213, it preferably is determined whether the key values stored in the left portion of that node are greater than or equal to the value of the key value being searched. The search within each internal node 213 is ceased when the first key is located which has a value less than the value of the key value being searched. The rightmost branch corresponding to this located key is then followed. If such a key value cannot be located, the leftmost branch is then followed. As discussed above, this preferred approach ensures that if duplicate key values are located in a single node, the leftmost key value among these duplicates is located. Thus, this method can be used to locate the leftmost key value among all duplicates in a single node.

Another exemplary preferred embodiment of the CSS-trees of the present invention, namely level CSS-trees, is now presented. As discussed above, level CSS-trees are similar to full CSS-trees. In level CSS-trees, however, the number of child nodes for each node equals m, where m is defined to be the number of entries in each node within the CSS-tree indexing structure. The value of m is also known as the branch factor for the CSS-tree. Thus, level CSS-trees are deeper than full CSS-trees. In addition, level CSS-trees can be constructed with nodes requiring on average fewer comparisons than are required by nodes in full CSS-trees, in the special case where m is an integer power of 2.

Figure 3:
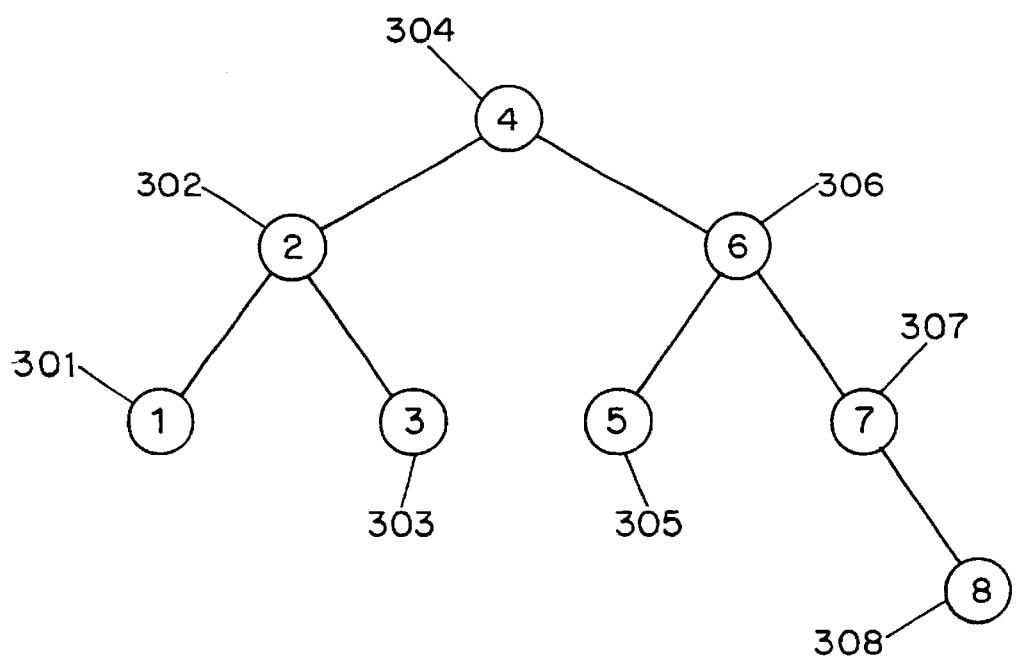
FIG. 3 is a schematic diagram illustrating an exemplary node structure of an exemplary CSS-tree index structure of the present invention.

Referring to the full CSS-trees discussed above, a full CSS-tree having m entries per node preferably will contain exactly m keys per node. Thus, all of the entries in each node are fully utilized in a full CSS-tree. FIG. 3 depicts an exemplary binary search tree for a single node in such a full CSS-tree having $m=2^3=8$ key entries per node. The key entries are numbered 1–8 and are represented by reference numerals 301–308, respectively. In the example depicted in FIG. 3, of the nine possible branches, seven branches require three comparisons and the other two branches require four comparisons. In contrast, in an exemplary level CSS-tree, one of the eight entries per node is not utilized, and there are therefore only seven, instead of eight, key entries per node. Thus, the exemplary level CSS-tree can be distinguished from the exemplary full CSS-tree configuration depicted in FIG. 3, where all key entries within a node contain a key value. As a result, each branch in the exemplary level CSS-tree will advantageously require only three comparisons.

Thus, for $m=2^t$, where t is the number of comparisons required for performing a binary search within a single node, a level CSS-tree preferably utilizes only m−1 entries per node, and therefore has a branching factor of m. A typical level CSS-tree will thus be deeper than a typical full CSS-tree having the same node size, because the branching factor for a level CSS-tree is m rather than m+1 as for a full CSS-tree. In an exemplary level CSS-tree, however, fewer comparisons must be performed for any individual node. If N is defined to be the number of nodes required to contain all of the elements in the sorted array 216, an exemplary level CSS-tree has $\log_m N$ tree levels, whereas an exemplary full CSS-tree has $\log_{m+1} N$ tree levels. The number of comparisons which must be performed for each individual node equals t for the level CSS-tree and $$t * \left(1 + \frac{2}{m+1}\right)$$

for the full CSS-tree. Therefore, the total number of comparisons required for all of the nodes in the exemplary level CSS-tree equals $\log_m N * t = \log_2 N$. For the exemplary full CSS-tree this value is equal to $$\log_{m+1} N * t * \left(1 + \frac{2}{m+1}\right) = \log_2 N * \log_{m+1} m * \left(1 + \frac{2}{m+1}\right).$$

The ratio of this value for the level CSS-trees to the value for the full CSS-trees equals $$\frac{(m+1)\log_m(m+1)}{m+3}.$$

Thus for searching, a level CSS-tree typically requires fewer comparisons than does a typical full CSS-tree. On the other hand, level CSS-trees may typically require $\log_m N$ cache accesses and $\log_m N$ node traversals to complete a search, as compared to only $\log_{m+1} N$ cache accesses and $\log_{m+1} N$ node traversals for full CSS-trees. Thus, the optimal choice between full CSS-trees and level CSS-trees depends on the relative speed and efficiency of comparison operations, node traversals and cache accesses. In addition, level CSS-tree utilize most of the data stored in each cache line. Although slightly more memory space may be required to store typical level CSS-trees than full CSS-trees, this may be acceptable in certain applications in view of the available performance improvements.

Figure 9:
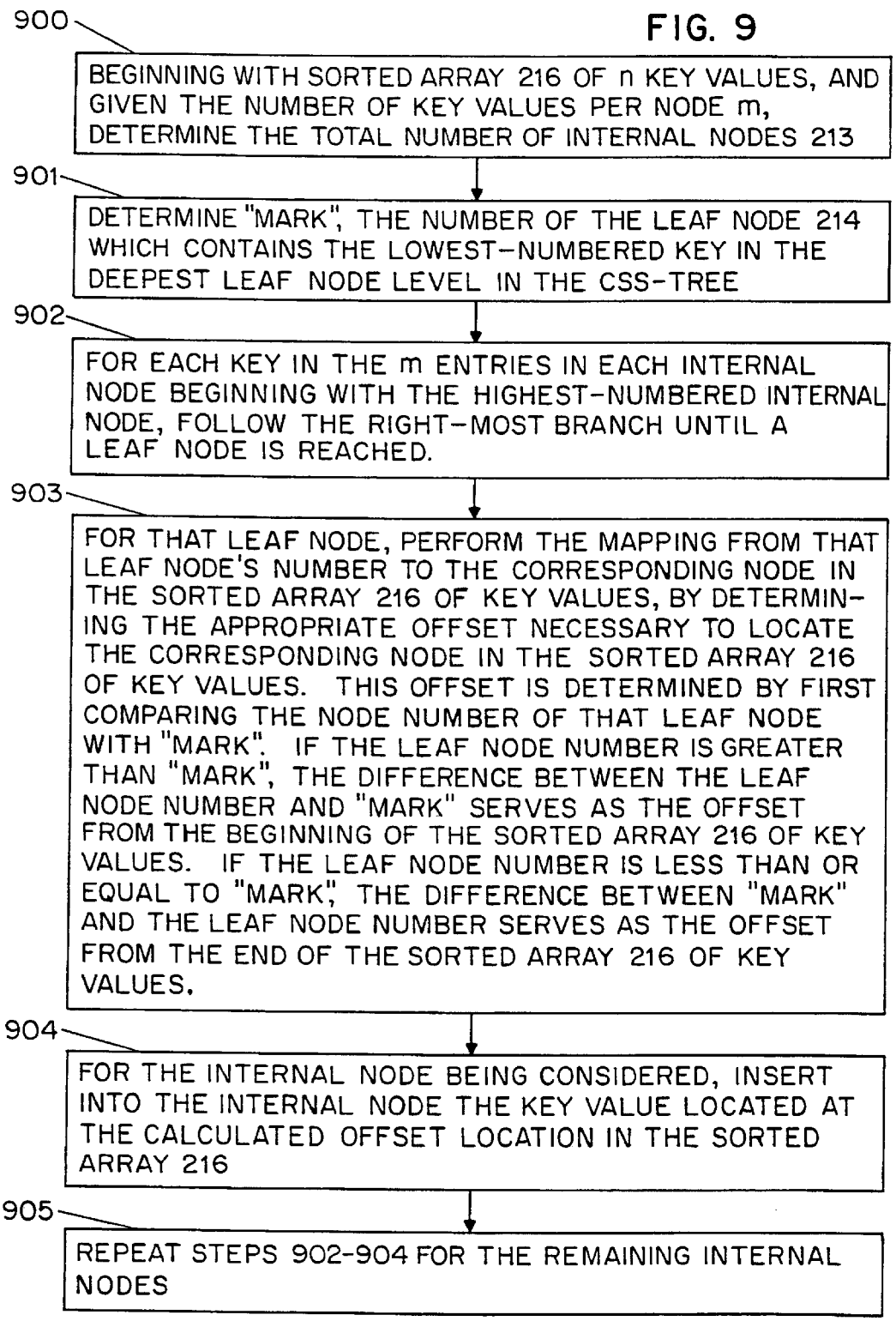
FIG. 9 is an exemplary process flow diagram for constructing search trees for the full and level CSS-tree search methods of the present invention.

FIG. 9 depicts an exemplary flow diagram for constructing an exemplary level or full CSS-tree of the present invention. As shown in block 900, there are first provided as operating parameters for the CSS-tree a sorted array 216 containing n key values, and the number of entries per node, which is denoted as m. From these parameters, the total number of internal nodes 213 is then determined. As shown in block 901, "Mark" is then determined. As discussed above, "Mark" is defined as the number of the leaf node in group of leaf nodes 214 which contains the lowest-numbered key in the deepest leaf node level in the CSS-tree.

As shown in block 902, beginning with the highest-numbered internal node, for each of the keys in the m entries in each internal node, the right-most branch path is followed until a leaf node 214 is reached. Then, as shown in block 903, for that leaf node the mapping from that leaf node number to the corresponding node in the sorted array 216 of key values is performed, by determining the appropriate offset necessary to locate the corresponding node in the sorted array 216 of key values. This offset is determined by first comparing the node number of that leaf node with "Mark." If the leaf node number is greater than "Mark," the difference between the leaf node number and "Mark" serves as the offset from the beginning of the sorted array 216 of key values. If the leaf node number is less than or equal to "Mark," the difference between "Mark" and the leaf node number serves as the offset from the end of the sorted array 216 of key values. As shown in block 904, for the internal node being considered, the key value located at the calculated offset location in the sorted array 216 is then inserted into that internal node. As shown in block 905, the steps enumerated in blocks 902–904 are then repeated for the remaining internal nodes.

Figure 10:
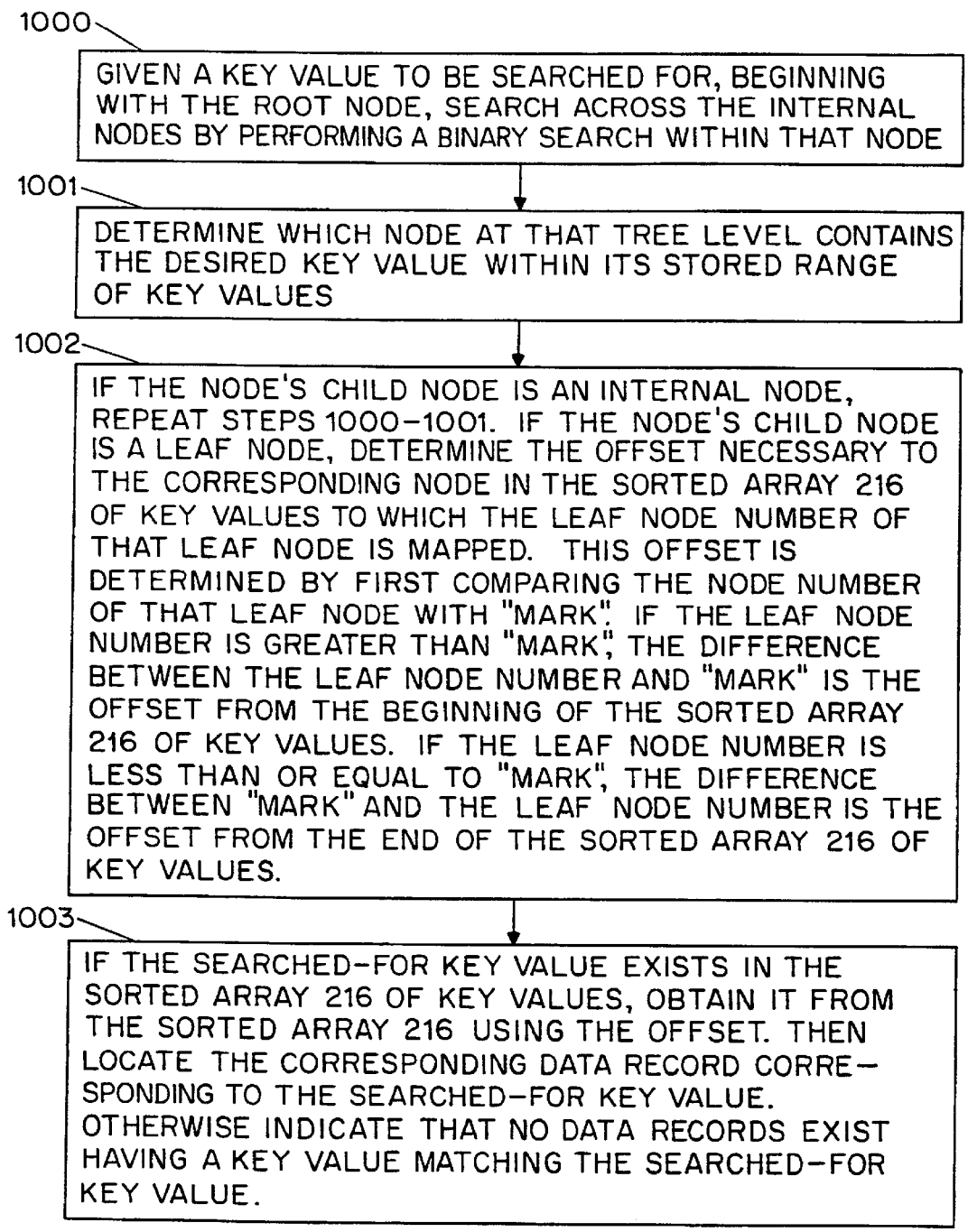
FIG. 10 is an exemplary process flow diagram for searching for a data record using the full and level CSS-tree search methods of the present invention.

FIG. 10 depicts an exemplary flow diagram for searching for a data record having a desired key value, utilizing an exemplary level or full CSS-tree of the present invention. As shown in block 1000, there is first provided a particular key value to be searched. Then, beginning with the root node in the CSS-tree, a search is performed across the internal nodes in that tree level. This is accomplished by performing a binary search within the internal nodes on that level. As shown in block 1001, this process is continued until it is determined which node at that tree level contains the desired key value within its stored range of key values.

As shown in block 1002, if the child nodes of the internal node being considered are internal nodes 213, then the steps denoted in blocks 1000–1001 are repeated. As also shown in block 1002, if on the other hand the child nodes of the internal node being considered are leaf nodes 214, the offset necessary to locate the corresponding node in the sorted array 216 of key values to which the leaf node number of that leaf node is mapped is then determined. This offset is determined by first comparing the node number of that leaf node with "Mark." If the leaf node number is greater than "Mark," the difference between the leaf node number and "Mark" is the offset from the beginning of the sorted array 216 of key values. If the leaf node number is less than or equal to "Mark," the difference between "Mark" and the leaf node number is the offset from the end of the sorted array 216 of key values.

As shown in block 1003, if the searched-for key value exists in the sorted array 216 of key values, the offset determined above is utilized to obtain the key value from the sorted array 216. From this located key value, the data record corresponding to the located key value can be easily located using any conventional method. If on the other hand the searched-for key value does not exist in the sorted array 216 of key values, this denotes that there is no data record having a key value matching the searched-for key value. In such an event, a message to this effect typically is provided.

Analytical comparisons between database searching performed using certain embodiments of the CSS-trees of the present invention and certain prior art searching methods are presented below in Tables 1a and 1b. Specifically, search performance (i.e., search time requirements) and memory space requirements are compared for the search methods shown. In the expressions presented in Tables 1a and 1b, m denotes the number of keys per node; R denotes the amount of main memory space consumed by a record identifier; K denotes the amount of main memory space consumed by a key; P denotes the amount of main memory space consumed by a child pointer; n denotes the number of individual records being indexed in sorted array 216; h denotes a hashing factor, which may typically be 1.2, thereby indicating that a hash table typically is approximately 20% larger than the raw data contained in the hash table; c denotes the size, in number of bytes, of a cache line; and s denotes the size, measured in number of cache lines, of a node in a T-tree, CSS-tree or enhanced B+-tree. For the analytical comparisons presented in Table 1, the following exemplary values have been selected for the following parameters: R=K P=4 bytes; n=$10^7$; h=1.2; c=64 bytes; and s=1.

TABLE 1a

Time Analysis

| Method | branching factor | # of levels (l) | comparisons per internal node (nComp) | comparisons per leaf node ($A_{child}$) |
|---|---|---|---|---|
| Binary search | 2 | $\log_2 n$ | 1 | 1 |
| T-trees | 2 | $\log_2 \frac{n}{m} - 1$ | 1 | $\log_2 m$ |
| enhanced B+-trees | $\frac{m}{2}$ | $\log_{\frac{m}{2}} \frac{n}{m}$ | $\log_2 m - 1$ | $\log_2 m$ |
| Full CSS-Trees | m | $\log_{m+1} \frac{n}{m}$ | $\left(1 + \frac{2}{m+1}\right)\log_2 m$ | $\log_2 m$ |
| Level CSS-Trees | m | $\log_m \frac{n}{m}$ | $\log_2 m$ | $\log_2 m$ | by $$s = \frac{mK}{c}.$$

Table 1a shows the exemplary branching factor, number of tree levels, number of comparisons per internal node, and number of comparisons per leaf node for each searching method shown. As shown in Table 1a, enhanced B+-trees are characterized by a smaller branching factor than are CSS-trees; this is because B+-trees store child pointers expressly. The total cost in time of each searching method has three primary components: namely, the comparison cost, the cost associated with moving across the different levels of the tree, and the cache miss cost. Table 1b depicts an exemplary comparison of these three costs for each search method shown. In Table 1b, D denotes the cost of de-referencing a pointer; and $A_b$, $A_{fcss}$, $A_{lcss}$ denote the cost in time of computing a child address for a binary search, full CSS-tree search and level CSS-tree search, respectively.

As shown in Table 1b, the respective exemplary comparison costs are relatively similar for all of the search methods shown, including searches utilizing full CSS-trees. As discussed above, the number of comparisons associated with searching using full CSS-trees typically is slightly higher than for searching using level CSS-trees. Certain search methods determine child nodes by following pointers, whereas others do so using arithmetic calculations. The relative comparison costs are a function of the complexity of the computations necessary to perform the comparison, and the efficiency of the hardware used. For example, although $A_b$ may be less than D, $A_{fcss}$ likely will be greater than D. Nevertheless, searching methods having higher branching factors also utilize relatively fewer tree levels, and therefore normally exhibit relatively lower costs of moving across tree levels. An overly large node size will increase the cache miss cost, however, which probably will constitute the overriding performance factor because each cache miss typically can be an order of magnitude more expensive than the computation of a child address.

The following exemplary analysis summarized in Table 1b assumes that cache memory 102 undergoes a so-called cold start, and therefore begins in an empty state. Thus, if the TABLE 1b Time Analysis

| Method | Total comparisons | Moving across Level | Cache Misses $\frac{mK}{c} \leq 1$ | Cache Misses $\frac{mK}{c} > 1$ |
|---|---|---|---|---|
| Binary search | $\log_2 n$ | $\log_2 n * A_b$ | $\log_2 n$ | $\log_2 n$ |
| T-trees | $\log_2 n$ | $\log_2 n * D$ | $\log_2 n$ | $\log_2 n$ |
| enhanced B+-trees | $\log_2 n$ | $\log_{\frac{m}{2}} \frac{n}{m} * D$ | $\frac{\log_2 n}{\log_2 m - 1}$ | $\log_{\frac{m}{2}} n\left(\left(\log_2 \frac{mK}{c}\right) + \frac{c}{mK}\right)$ |
| Full CSS-trees | $\frac{m+3}{m+1}\log_{m+1} m \log_2 n$ | $\log_{m+1} \frac{n}{m} * A_{fcss}$ | $\frac{\log_2 n}{\log_2(m+1)}$ | $\log_{m+1} n\left(\left(\log_2 \frac{mK}{c}\right) + \frac{c}{mK}\right)$ |
| Level CSS-trees | $\log_2 n$ | $\log_m \frac{n}{m} * A_{lcss}$ | $\frac{\log_2 n}{\log_2 m}$ | $\log_m n\left(\left(\log_2 \frac{mK}{c}\right) + \frac{c}{mK}\right)$ |

Selecting the same values for R, P and K simplifies the exemplary analysis summarized in Tables 1a and 1b. Thus, the size of a node measured in number of cache lines is given by node size is smaller than the cache line size, each level of the search tree in question generates only one cache miss. On the other hand, if the node size is larger than the cache line size, the number of cache misses per node for each search is estimated to be $$(\log_2 s) + \frac{1}{s} = \left(\log_2 \frac{mk}{c}\right) + \frac{c}{mK}.$$

Thus, the total number of cache misses for the aggregate of all the keys is $s*(\log_2 s)+1$. Assuming each cache line is equally likely to be written into upon a cache miss, this value is divided by s to obtain the average number of cache misses for any single key. The exemplary results of this analysis for each search method shown are summarized in the rightmost two columns of Table 1b.

For most conventional configurations, the number of cache misses is minimized when the node size equals the cache line size. As shown in the rightmost two columns of Table 1b, the quantity of cache misses for binary and T-tree searching is independent of m. As is also shown therein, searching performed in connection with enhanced B+-trees and CSS-trees typically generates only a fraction of the cache misses generated by a binary search, with CSS-trees typically exhibiting better performance than enhanced B+-trees in this regard. Thus, CSS-trees typically exhibit the lowest number of cache misses of any of the searching methods shown. As shown in the rightmost two columns of Table 1b, as m gets larger the number of cache misses approaches $\log_2 n$ for each of the exemplary methods shown. This indicates that as m increases, the performance of each search method in effect degrades to that of a binary search. As shown in Table 1b, when compared with full CSS-trees, level CSS-trees typically exhibit a higher rate of cache misses, but also perform fewer comparisons. Because $A_{lcss}$ is less than $A_{fcss}$, it is difficult to directly compare the relative costs of moving across tree levels using full CSS-trees as compared to level CSS-trees.

As shown in Tables 1a and 1b, the performance associated with searching performed using the exemplary CSS-trees normally should be significantly better than that associated with binary searching, T-tree searching, and/or enhanced B+-tree searching. In addition, if a number of searches are performed in sequence, for example, the highest level CSS-tree nodes will remain resident in cache, thereby improving performance. In addition, because CSS-trees typically have fewer tree levels than do trees associated with the other types of search methods, CSS-trees will also benefit the most from a warm cache startup, wherein the cache begins in a non-empty state.

Table 2 below provides a summary of the respective exemplary memory space requirements for each of the exemplary searching methods shown in Tables 1a and 1b, as well as hash table searching. In Table 2, the column entitled "Space (indirect)" denotes the exemplary memory space requirements of the exemplary search methods shown, assuming that the structure being indexed constitutes a collection of record identifiers which can be rearranged if necessary. That is to say, the expressions denoted in this column assume that it is acceptable for the particular search method to store the record identifiers internally within the search tree structure, as opposed to leaving the record identifiers in the form of an unaltered contiguous list. Thus, the memory space consumed by the record identifiers themselves is not included in the expressions appearing in this column of Table 2, because all of the search methods shown share this space requirement. The column in Table 2 appearing immediately to the right of the column entitled "Space (indirect)" denotes typical memory space requirement values for this exemplary arrangement.

TABLE 2

| | Space analysis | | | | |
|---|---|---|---|---|---|
| Method | Space (indirect) | Typical Value | Space (direct) | Typical Value | RID-Ordered Access |
| Binary search | 0 | 0 MB | 0 | 0 MB | Y |
| Full CSS-trees | $\dfrac{nK^2}{sc}$ | 2.5 MB | $\dfrac{nK^2}{sc}$ | 2.5 MB | Y |
| Level CSS-trees | $\dfrac{nK^2}{sc - K}$ | 2.7 MB | $\dfrac{nK^2}{sc - K}$ | 2.7 MB | Y |
| enhanced B+-trees | $\dfrac{nK(P + K)}{sc - P - K}$ | 5.7 MB | $\dfrac{nK(P + K)}{sc - P - K}$ | 5.7 MB | Y |
| Hash table | $(h - 1)nR$ | 8 MB | $hnR$ | 48 MB | N |
| T-trees | $\dfrac{2nP(K + R)}{sc - 2P}$ | 11.4 MB | $\dfrac{2nP(K + R)}{sc - 2P} + nR$ | 51.4 MB | Y |

In contrast, the column in Table 2 entitled "Space (direct)" denotes the exemplary main memory space requirements of the search methods shown, assuming that the structure being indexed constitutes a collection of records that cannot be rearranged in such a way. That is to say, the expressions denoted in this column assume that it is not acceptable for the particular search method to store the records internally within the search tree structure. Thus for the T-tree and hash table searching methods, the amount of memory space consumed by the record identifiers is included in the expressions appearing in this column of Table 2, because the other exemplary search methods shown do not require these record identifiers in such a scenario. The column in Table 2 appearing immediately to the right of the column entitled "Space (direct)" denotes typical exemplary memory space requirement values for this arrangement.

As shown in the rightmost column of Table 2, all search methods shown except for hash table searching support access in Record I.D. (RID)-order. The expressions shown in the columns in Table 2 entitled "Space (direct)" and "Space (indirect)" for Level CSS-trees assume that $$\frac{sc}{K}$$

is an integer power of 2.

Figure 4A:
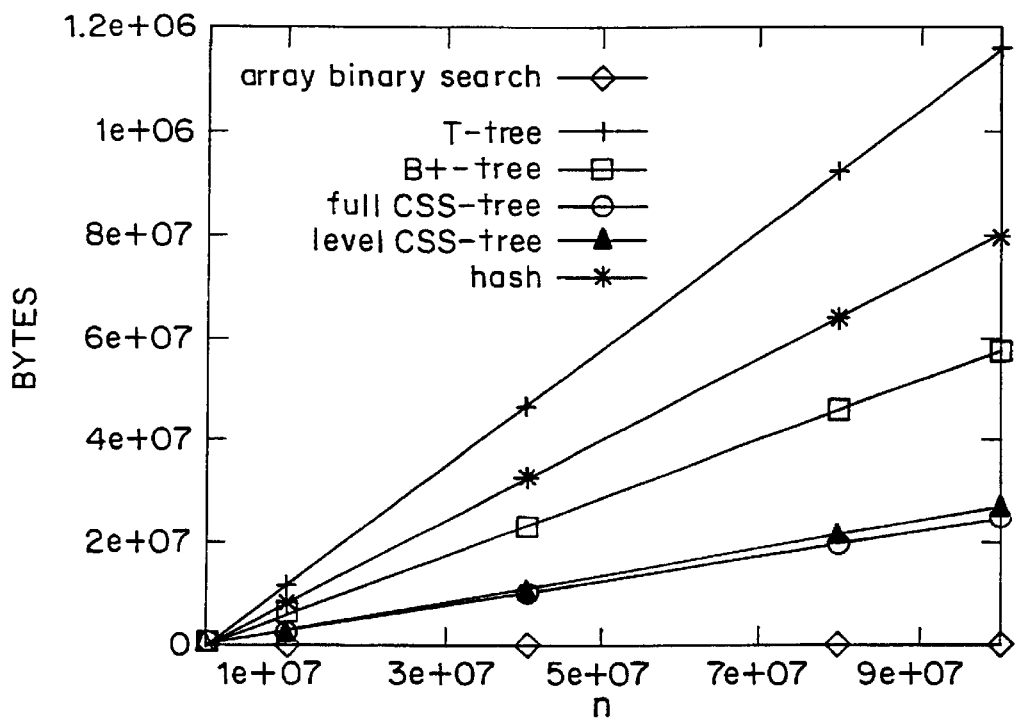
FIG. 4a is a graph representing exemplary data comparing the memory space (indirect) requirements for various search methods, including the full CSS-tree and level CSS-tree search methods of the present invention.
Figure 4B:
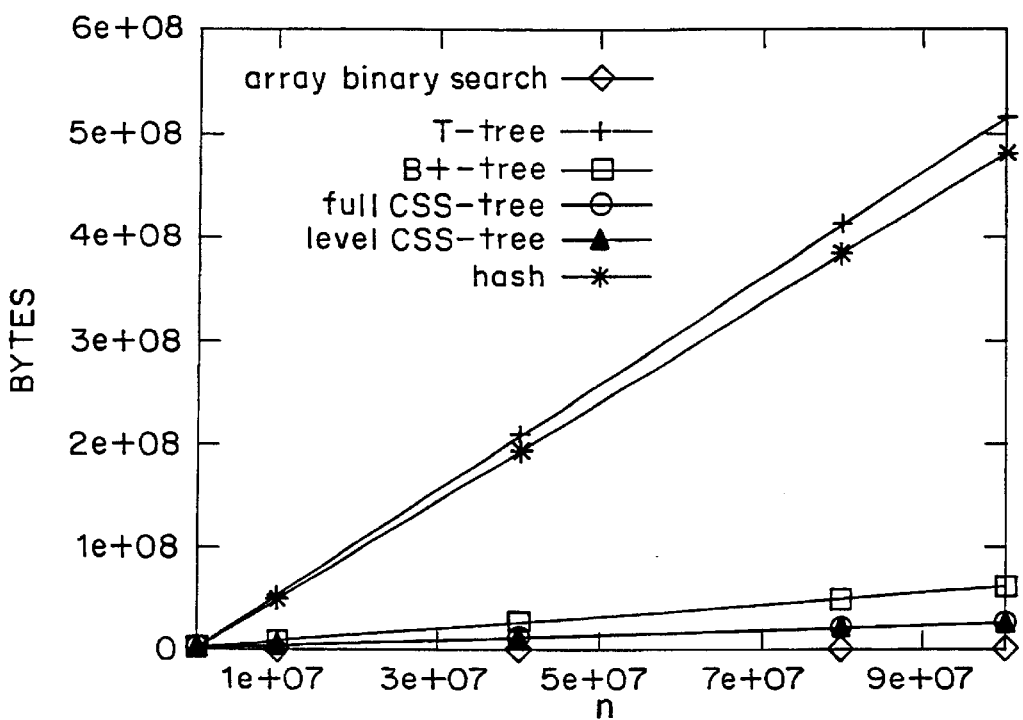
FIG. 4b is a graph representing exemplary data comparing the memory space (direct) requirements of various search methods, including the full CSS-tree and level CSS-tree search methods of the present invention.

FIGS. 4a and 4b depict a comparison of typical exemplary memory space requirements as a function of sorted array size n, for the exemplary search methods shown in Table 2. In particular, FIG. 4a depicts these memory space requirements corresponding to the above-discussed Table 2 column entitled "Space (indirect)." whereas FIG. 4b depicts these memory space requirements corresponding to the above-discussed Table 2 column entitled "Space (direct)." In FIGS. 4a and 4b, it is assumed that R=K=P=4 bytes; h=1.2; c=64 bytes; and s=1. As clearly shown in FIGS. 4a and 4b, the exemplary hash tables and T-trees consume substantially more memory space than do the exemplary CSS-trees.

Exemplary performance comparisons between database searching performed using exemplary preferred embodiments of the CSS-trees of the present invention and other types of searching methods, such as those shown in Table 2, are presented in FIGS. 5–8, below. These exemplary preferred embodiments utilize two exemplary preferred modem platforms, and performance is considered as a function of the time required to perform a large number of successful random lookups to the particular index and array of values being considered. In particular, the two exemplary modem platforms considered are a Sun Microsystems Ultra Sparc II machine (preferably operating at 296 MHZ and having 1 GB of RAM) and a Pentium II personal computer (preferably operating at 333 MHZ and having 128 MB of RAM). The exemplary Ultra Sparc II machine preferably utilizes a 16 KB on-chip cache having a 32 byte cache line size and an associativity of 1, as well as a 1 MB secondary level cache having a 64 byte cache line size and an associativity of 1. The exemplary Pentium II machine preferably utilizes a 16 KB on-chip cache having a 32 byte cache line size and an associativity of 4, as well as a 512 KB secondary level cache having a 32 byte cache line size and an associativity of 4. Both exemplary machines preferably utilize an exemplary Sun Microsystems Solaris 2.6 operating system.

In these exemplary preferred embodiments, the following searching methods were implemented using the preferred C++ programming language: exemplary full CSS-tree and level CSS-tree searching methods of the present invention, as well as conventional chained bucket hashing searching, array binary searching, tree binary searching, T-tree searching, enhanced B+-tree searching, and well-known interpolation searching set forth in W. W. Peterson, IBM J. Research & Development, No. 1, pp. 131–132, 1957, the contents of which is incorporated herein by reference. All keys utilized preferably are selected randomly from exemplary integers ranging between 0 and 1,000,000. Each key preferably consumes 4 bytes of memory. All lookup keys preferably are generated in advance to prevent the key generation time from impacting the recorded performance results. An exemplary total of 100,000 searches were performed on randomly selected matching key values.

In these exemplary preferred embodiments, varying node sizes are preferably implemented by allocating a large block of memory to reduce allocation time. When possible, logical shifts are preferably used in place of multiplication and division operations. Preferably, to reduce overhead the binary search loop for each internal node is unfolded by hardcoding all of the so-called "if-else" tests. Similarly, leaf node searches also are preferably hardcoded. Also, once the searching range becomes sufficiently narrow, equality testing is preferably performed sequentially on each key. The sorted array being searched preferably is properly aligned accordingly to the cache line size being used. In addition, all of the tree nodes preferably are allocated at the same time, and the starting addresses thereof properly aligned.

Figure 5:
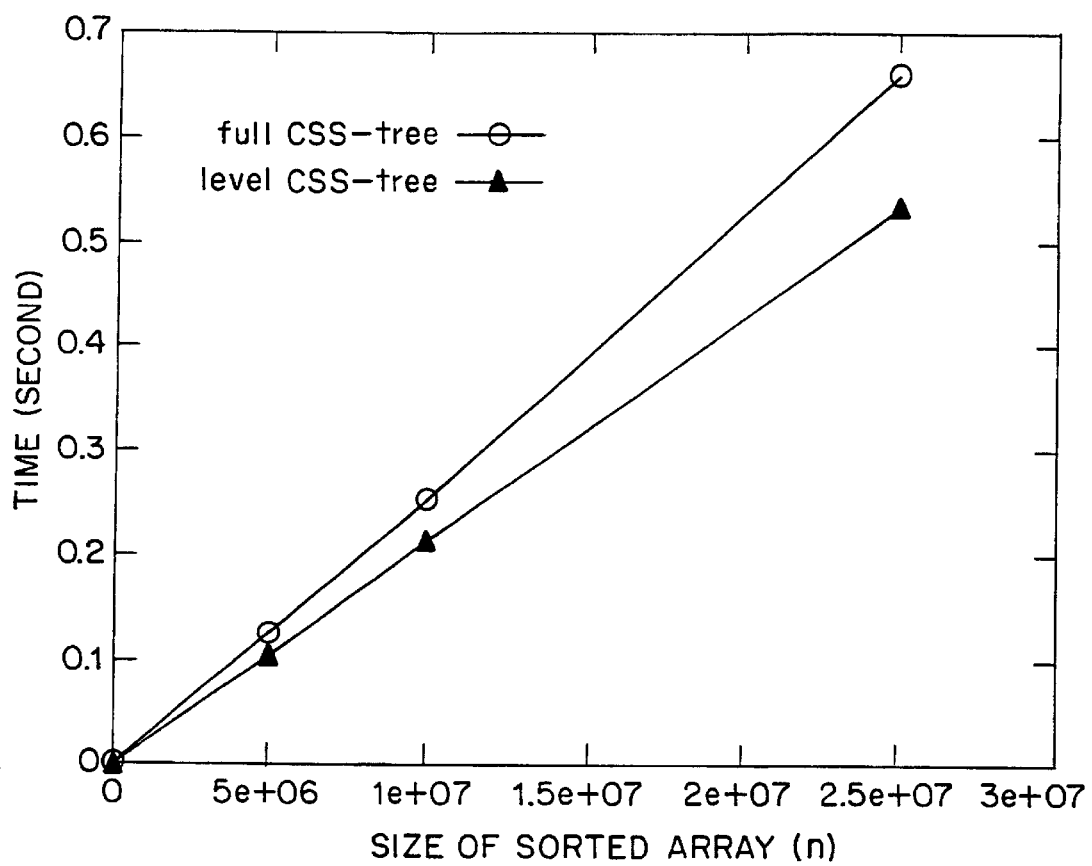
FIG. 5 is a graph representing exemplary data of the time required to construct an exemplary full CSS-tree and an exemplary level CSS-tree as a function of the size of the sorted array to be searched.

In the first exemplary performance comparison of the exemplary preferred embodiments, the amount of time required to build an exemplary CSS-tree of the present invention is considered. FIG. 5 depicts the time required to build both an exemplary full CSS-tree and an exemplary level CSS-tree as a function of the size of the sorted array 216 to be searched. As depicted in FIG. 5, the building time for each type of exemplary CSS-tree typically increases linearly as a function of the sorted array size. Less time typically is required to build the exemplary level CSS-trees than the exemplary full CSS-trees, because in the case of the exemplary level CSS-trees it is not necessary to traverse each subtree within the search tree in order to locate the largest key.

The respective search time performance for certain specific examples of preferred embodiments of the full CSS-tree and level CSS-tree index searching methods of the present invention are presented below, together with the search time performance of the other exemplary conventional searching methods considered. As noted above, these conventional searching methods include conventional chained bucket hashing searching, array binary searching, tree binary searching, T-tree searching, enhanced B+-tree searching, and interpolation searching. In a first specific example of the preferred embodiment of the present invention considered, the size of the sorted array preferably is varied, whereas the node size preferably is fixed to one of two sizes corresponding to the cache line size in each of the two levels of cache in the Ultra Sparc II machine (i.e., preferably 32 bytes and 64 bytes).

Figure 6A:
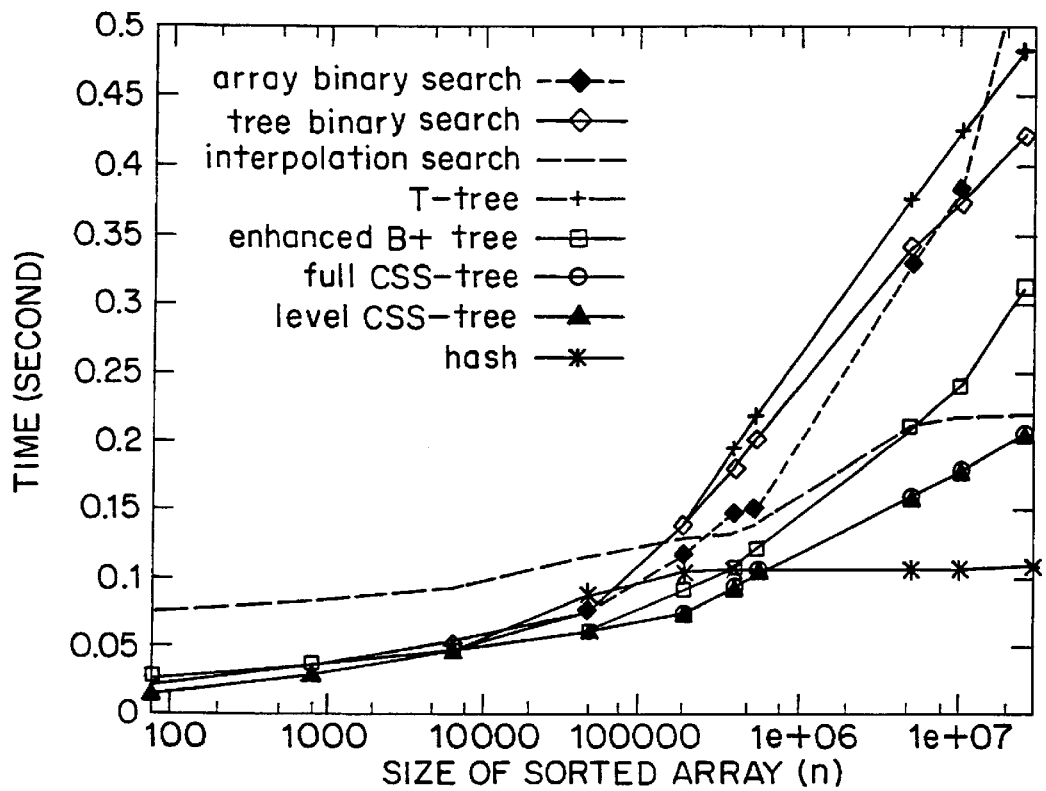
FIG. 6a is a graph representing exemplary data comparing the performance characteristics of various search methods, including the full and level CSS-tree search methods of the present invention, wherein the node size is 32 bytes.
Figure 6B:
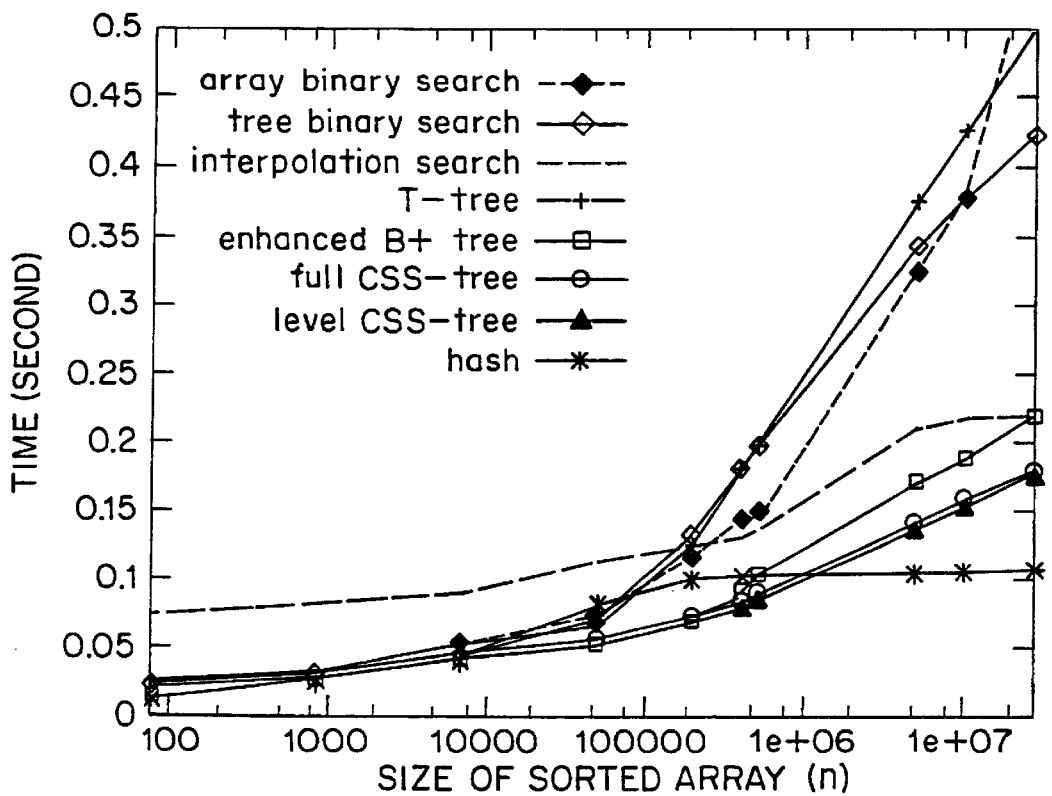
FIG. 6b is a graph representing exemplary data comparing the performance characteristics of various search methods, including the full and level CSS-tree search methods of the present invention, wherein the node size is 64 bytes.

FIGS. 6a and 6b depict exemplary search performance results for the exemplary preferred embodiments implemented on the preferred Ultra Sparc II machine. Specifically, FIG. 6a corresponds to the specific example wherein the node size is 32 bytes, and FIG. 6b corresponds to the specific example wherein the node size is 64 bytes. As is shown in FIGS. 6a and 6b, when all of the data in the sorted array fits in the cache, there is relatively little difference in the respective performances of each of the preferred search methods considered. As the amount of data in the sorted array increases beyond the size of the cache, however, the exemplary CSS-tree search methods of the present invention perform better than the conventional searching methods, with the exception of hashing. In addition, and as also depicted in FIGS. 6a and 6b, the exemplary level CSS-trees performed somewhat better than did the exemplary full CSS-trees. Although the performance of the hash searching was comparable to that of the exemplary CSS-tree searching of the present invention, hash searching consumes many times more memory space than does CSS-tree searching.

Figure 7A:
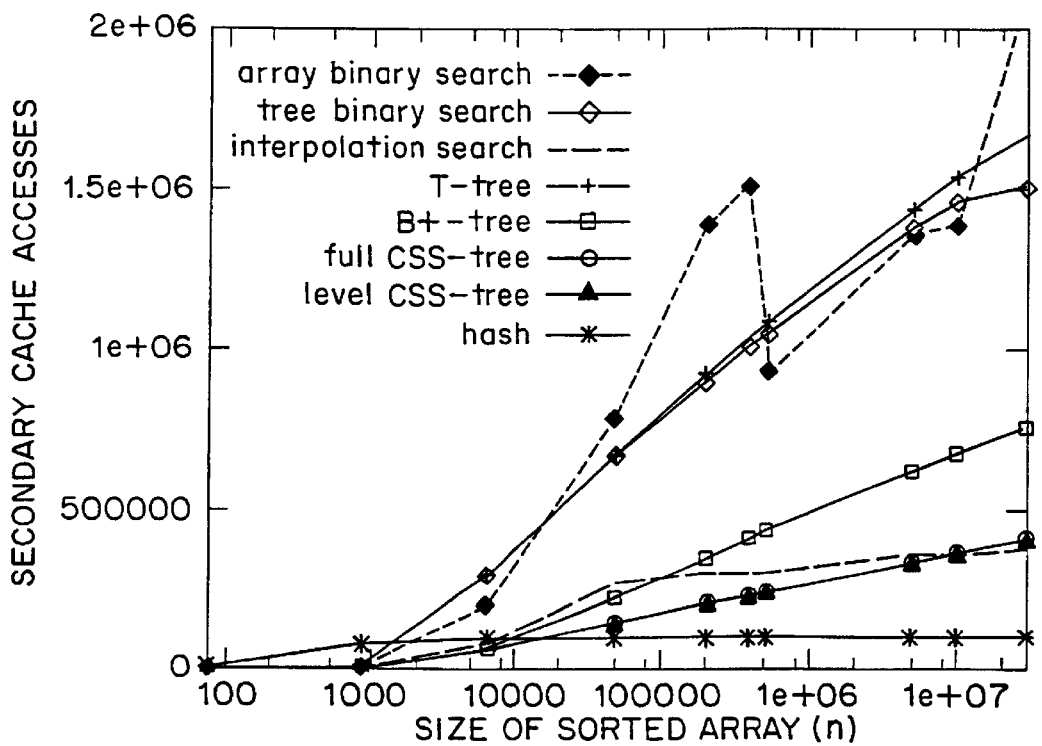
FIG. 7a is a graph representing exemplary data comparing the first-level cache miss performance characteristics of various search methods, including the full and level CSS-tree search methods of the present invention.
Figure 7B:
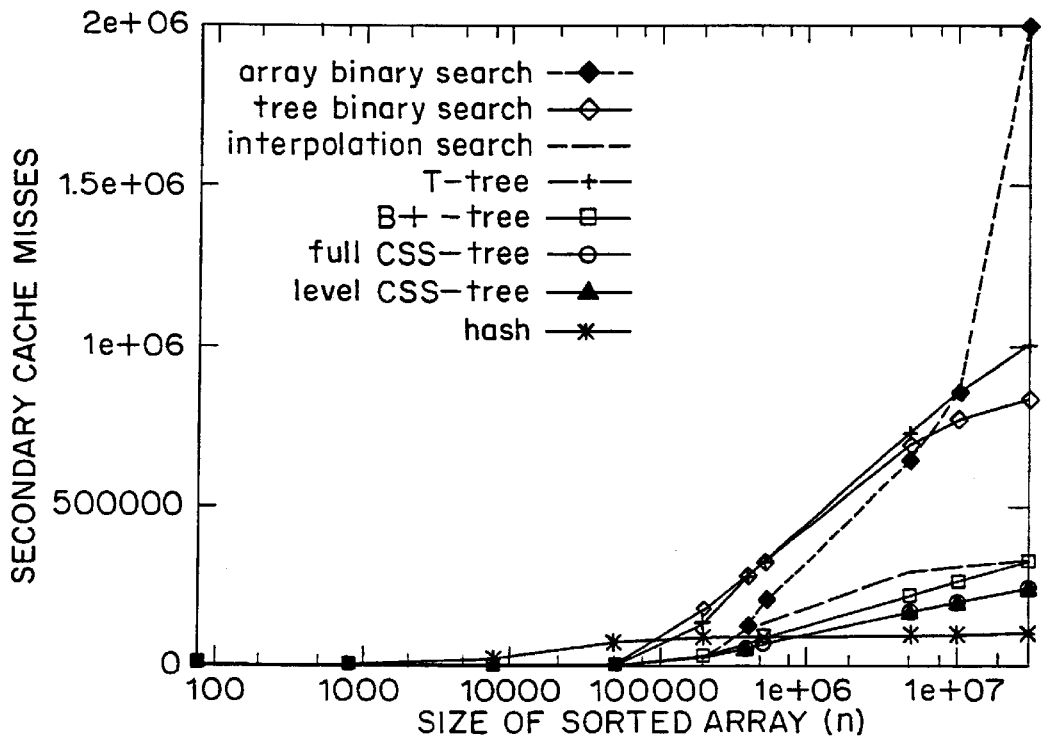
FIG. 7b is a graph representing exemplary data comparing the second-level cache miss performance characteristics of various search methods, including the full and level CSS-tree search methods of the present invention.

To compare the actual number of cache misses which occurred in the above-discussed preferred examples, the above-discussed exemplary searches were run utilizing a cache simulator. FIGS. 7a and 7b depict the number of first and second level cache misses, respectively, for an exemplary cache preferably configured to simulate the exemplary preferred cache of the Ultra Sparc II machine (wherein the node size preferably is configured to be 64 bytes). As depicted in FIGS. 7a and 7b, as the size of the sorted array increases, a larger number of cache misses occur. The performance results obtained when these exemplary searches are implemented on the exemplary Pentium II machine are similar to those obtained on the exemplary Ultra Sparc II machine.

Figure 8:
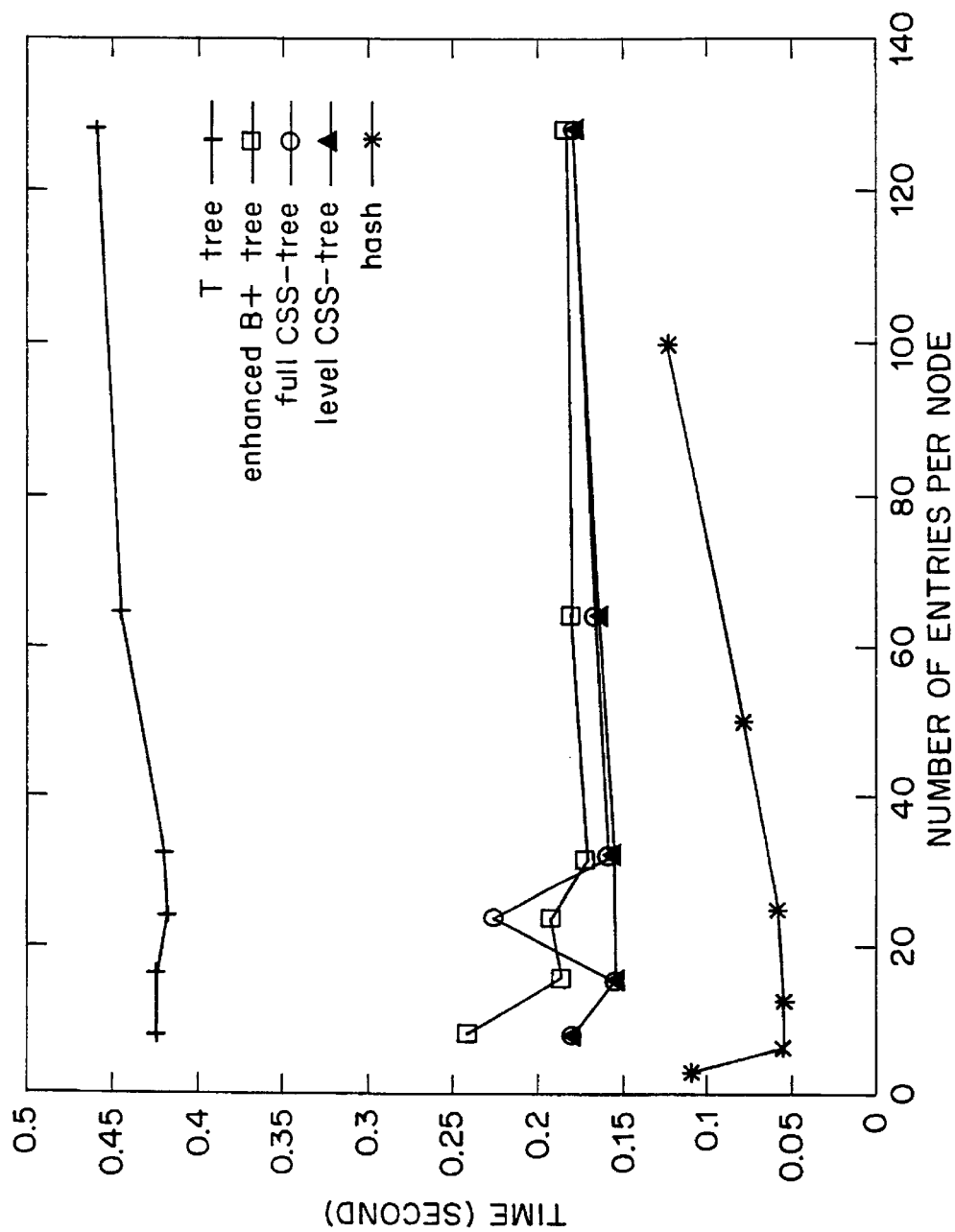
FIG. 8 is a graph representing exemplary data comparing the performance characteristics of various search methods, including the full and level CSS-tree search methods of the present invention, for an embodiment where the sorted array is fixed in size and the node size is varied.

In a second specific example of the preferred embodiment of the present invention considered, the size of the sorted array preferably is fixed, whereas the node size preferably is varied. FIG. 8 depicts the search performance results for this example run on the preferred Ultra II machine. As depicted in FIG. 8, in this example the smallest preferred node size for the CSS-trees of the present invention is 16 integers per node, which corresponds to the preferred Ultra Sparc II machine's preferred 64 byte secondary cache size. The exemplary CSS-trees' decrease in performance occurring where the node size is 24 integers per node may be partially a result of the node size not being a multiple of the cache line size. In this instance, the nodes are not aligned with the cache lines, which results in a greater number of undesirable cache misses. As shown in FIG. 8, the decrease in performance for the exemplary full CSS-trees is more dramatic than for the exemplary level CSS-tree. This is because the cost in time of arithmetically computing the offsets for child nodes increases for m=24, because in this instance division and multiplication, rather than more efficient logical shifts, must be used for this purpose.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A search tree index system for locating a particular key value stored in a sorted array of key values, comprising:
   a computer memory for storing a search tree having a plurality of leaf nodes, each said leaf node containing a plurality of key values, said leaf nodes being capable of referencing said key values stored in said sorted array of key values according to a first offset value; and a plurality of internal nodes, each said internal node containing a plurality of key values, each said internal node having a plurality of children nodes associated therewith, said children nodes being configured to be referenced by said internal node associated therewith according to a second offset value, said children nodes associated with each said internal node comprising either a plurality of said internal nodes or a plurality of said leaf nodes; and
   a computer processor having associated therewith a cache memory having characteristics including a cache size, a cache line size and an associativity level, said computer processor being coupled to said computer memory for computational access to said sorted array of key values, to said plurality of leaf nodes and to said plurality of internal nodes, for determining for said particular key value said second offset value necessary to reference said children nodes from said internal nodes, for determining for said particular key value said first offset value necessary to reference said particular key value in said sorted array of key values from said leaf nodes, and for locating said particular key value in said sorted array of key values, wherein the quantity of internal nodes comprising said plurality of internal nodes and the quantity of leaf nodes comprising said plurality of leaf nodes correspond to said characteristics of said cache memory.

2. The system of claim 1, wherein said plurality of internal nodes and said plurality of leaf nodes are stored in a computer memory in the form of an array.

3. The system of claim 2, wherein the quantity of key values comprising said plurality of key values contained in each said leaf node is equal to the quantity of key values comprising said plurality of key values contained in each said internal node, and wherein said size of said cache line corresponds to said quantity of key values comprising said plurality of key values contained in each said leaf node and in each said internal node.

4. The system of claim 3, wherein said size of said cache line is at least as large as said quantity of key values comprising said plurality of key values contained in each said leaf node and in each said internal node.

5. The system of claim 2, wherein said plurality of leaf nodes reference said key values stored in said sorted array of key values according to an array mapping scheme.

6. The system of claim 3, wherein said first offset value and said second offset value are each determined according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node, and the quantity of key values stored in said sorted array of key values.

7. The system of claim 1, wherein the quantity of key values comprising said plurality of key values contained in each said leaf node is equal to the quantity of key values comprising said plurality of key values contained in each said internal node, and wherein the quantity of children nodes comprising said plurality of children nodes associated with each said internal node is the same for each said internal node, and is also equal to one greater than said quantity of key values comprising said plurality of key values contained in each said leaf node and in each said internal node.

8. The system of claim 7, wherein said plurality of internal nodes and said plurality of leaf nodes are stored in a computer memory in the form of an array.

9. The system of claim 8, wherein said size of said cache line corresponds to said quantity of key values comprising said plurality of key values contained in each said leaf node and in each said internal node.

10. The system of claim 9, wherein said size of said cache line is at least as large as said quantity of key values comprising said plurality of key values contained in each said leaf node and in each said internal node.

11. The system of claim 8, wherein said plurality of leaf nodes reference said key values stored in said sorted array of key values according to an array mapping scheme.

12. The system of claim 9, wherein said first offset value and said second offset value are each determined according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node, and the quantity of key values stored in said sorted array of key values.

13. The system of claim 1, wherein the quantity of key values comprising said plurality of key values contained in each said leaf node is equal to the quantity of key values comprising said plurality of key values contained in each said internal node, and wherein the quantity of children nodes comprising said plurality of children nodes associated with each said internal node is the same for each said internal node and is also equal to said quantity of key values comprising said plurality of key values contained in each said leaf node and in each said internal node.

14. The system of claim 13, wherein said plurality of internal nodes and said plurality of leaf nodes are stored in a computer memory in the form of an array.

15. The system of claim 14, wherein said size of said cache line corresponds to said quantity of key values comprising said plurality of key values contained in each said leaf node and in each said internal node.

16. The system of claim 15, wherein said size of said cache line is at least as large as said quantity of key values comprising said plurality of key values contained in each said leaf node and in each said internal node.

17. The system of claim 14, wherein said plurality of leaf nodes reference said key values stored in said sorted array of key values according to an array mapping scheme.

18. The system of claim 15, wherein said first offset value and said second offset value are each determined according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node, and the quantity of key values stored in said sorted array of key values.

19. A method for locating a particular key value stored in a sorted array of key values, comprising the steps of:
  generating a plurality of leaf nodes, each said leaf node containing a plurality of key values, said leaf nodes being capable of referencing said key values stored in said sorted array of key values according to a first offset value;
  generating a plurality of internal nodes, each said internal node containing a plurality of key values, each said internal node having a plurality of children nodes associated therewith, said children nodes being configured to be referenced by said internal node associated therewith according to a second offset value, said children nodes associated with each said internal node comprising either a plurality of said internal nodes or a plurality of said leaf nodes;
  determining for said particular key value said second offset value necessary to reference said children nodes from said internal nodes;
  determining for said particular key value said first offset value necessary to reference said particular key value in said sorted array of key values from said leaf nodes; and
  locating said particular key value in said sorted array of key values, wherein the quantity of internal nodes comprising said plurality of internal nodes and the quantity of leaf nodes comprising said plurality of leaf nodes are selected according to characteristics of a cache memory associated with a computer processor coupled to said sorted array of key values, said plurality of leaf nodes and said plurality of internal nodes, said characteristics of said cache memory including a cache size, a cache line size and an associativity level.

20. The method of claim 19, further comprising the steps of:
  selecting the quantity of key values comprising said plurality of key values contained in each said leaf node to be equal to the quantity of key values comprising said plurality of key values contained in each said internal node; and
  selecting the quantity of children nodes comprising said plurality of children nodes associated with each said internal node to be the same for each said internal node, and also to be equal to one greater than said quantity of key values comprising said plurality of key values contained in each said leaf node and in each said internal node.

21. The method of claim 20, further comprising the step of storing said plurality of internal nodes and said plurality of leaf nodes in a computer memory in the form of an array.

22. The method of claim 21, further comprising the step of selecting said quantity of key values comprising said plurality of key values contained in each said leaf node and in each said internal node to correspond to said cache line size of said cache memory.

23. The method of claim 22, further comprising the step of selecting said size of said cache line to be at least as large as said quantity of key values comprising said plurality of key values contained in each said leaf node and in each said internal node.

24. The method of claim 21, further comprising the step of said plurality of leaf nodes referencing said key values stored in said sorted array of key values according to an array mapping scheme.

25. The method of claim 22, further comprising the step of determining said first offset value and said second offset value according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node, and the quantity of key values stored in said sorted array of key values.

26. The method of claim 19, further comprising the steps of:
  selecting the quantity of key values comprising said plurality of key values contained in each said leaf node to be equal to the quantity of key values comprising said plurality of key values contained in each said internal node; and
  selecting the quantity of children nodes comprising said plurality of children nodes associated with each said internal node to be the same for each said internal node, and also to be equal to said quantity of key values comprising said plurality of key values contained in each said leaf node and in each said internal node.

27. The method of claim 26, further comprising the step of storing said plurality of internal nodes and said plurality of leaf nodes in a computer memory in the form of an array.

28. The method of claim 27, further comprising the step of selecting said quantity of key values comprising said plurality of key values contained in each said leaf node and in each said internal node to correspond to said cache line size of said cache memory.

29. The method of claim 28, further comprising the step of selecting said size of said cache line to be at least as large as said quantity of key values comprising said plurality of key values contained in each said leaf node and in each said internal node.

30. The method of claim 27, further comprising the step of said plurality of leaf nodes referencing said key values stored in said sorted array of key values according to an array mapping scheme.

31. The method of claim 28, further comprising the step of determining said first offset value and said second offset value according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node; and the quantity of key values stored in said sorted array of key values.

32. A computer readable media containing a program for use in locating a particular key value stored in a sorted array of key values, said program comprising:

a first program routine for forming a search tree having a plurality of leaf nodes, each said leaf node containing a plurality of key values, said leaf nodes being capable of referencing said key values stored in said sorted array of key values according to a first offset value; and having a plurality of internal nodes, each said internal node containing a plurality of key values, each said internal node having a plurality of children nodes associated therewith, said children nodes being configured to be referenced by said internal node associated therewith according to a second offset value, said children nodes associated with each said internal node comprising either a plurality of said internal nodes or a plurality of said leaf nodes, wherein the quantity of internal nodes comprising said plurality of internal nodes and the quantity of leaf nodes comprising said plurality of leaf nodes correspond to characteristics of a cache memory associated with a computer processor configured to operate on said sorted array of key values, said plurality of leaf nodes and said plurality of internal nodes, said characteristics of said cache memory including a cache size, a cache line size and an associativity level; and a second program routine for accessing said plurality of internal nodes, said plurality of children nodes associated therewith, said plurality of leaf nodes, and said sorted array of key values; for determining for said particular key value said second offset value necessary to reference said children nodes from said internal nodes; for determining for said particular key value said first offset value necessary to reference said particular key value in said sorted array of key values from said leaf nodes; and for locating said particular key value in said sorted array of key values.

33. The computer readable media of claim 32, wherein the quantity of key values comprising said plurality of key values contained in each said leaf node is equal to the quantity of key values comprising said plurality of key values contained in each said internal node, and wherein the quantity of children nodes comprising said plurality of children nodes associated with each said internal node is the same for each said internal node, and is also equal to one greater than said quantity of key values comprising said plurality of key values contained in each said leaf node and in each said internal node.

34. The computer readable media of claim 33, wherein said plurality of internal nodes and said plurality of leaf nodes are stored in the form of an array.

35. The computer readable media of claim 34, wherein said quantity of key values comprising said plurality of key values contained in each said leaf node and in each said internal node correspond to said cache line size of said cache memory.

36. The computer readable media of claim 35, wherein said size of said cache line is at least as large as said quantity of key values comprising said plurality of key values contained in each said leaf node and in each said internal node.

37. The computer readable media of claim 34, wherein said plurality of leaf nodes reference said key values stored in said sorted array of key values according to an array mapping scheme.

38. The computer readable media of claim 35, wherein said first offset value and said second offset value are each determined according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node, and the quantity of key values stored in said sorted array of key values.

39. The computer readable media of claim 32, wherein the quantity of key values comprising said plurality of key values contained in each said leaf node is equal to the quantity of key values comprising said plurality of key values contained in each said internal node, and wherein the quantity of children nodes comprising said plurality of children nodes associated with each said internal node is the same for each said internal node, and is also equal to said quantity of key values comprising said plurality of key values contained in each said leaf node and in each said internal node.

40. The computer readable media of claim 39, wherein said plurality of internal nodes and said plurality of leaf nodes are stored in the form of an array.

41. The computer readable media of claim 40, wherein said quantity of key values comprising said plurality of key values contained in each said leaf node and in each said internal node correspond to said cache line size of said cache memory.

42. The computer readable media of claim 41, wherein said size of said cache line is at least as large as said quantity of key values comprising said plurality of key values contained in each said leaf node and in each said internal node.

43. The computer readable media of claim 40, wherein said plurality of leaf nodes reference said key values stored in said sorted array of key values according to an array mapping scheme.

44. The computer readable media of claim 41, wherein said first offset value and said second offset value are each determined according to the quantity of internal nodes comprising said plurality of internal nodes, the quantity of leaf nodes comprising said plurality of leaf nodes, said quantity of key values comprising said plurality of key values contained in each said leaf node and in each said internal node, the quantity of children nodes comprising said plurality of children nodes associated with and configured to be referenced by each said internal node. and the quantity of key values stored in said sorted array of key values.

* * * * *